(12) United States Patent
Tam et al.

(10) Patent No.: US 8,213,711 B2
(45) Date of Patent: Jul. 3, 2012

(54) METHOD AND GRAPHICAL USER INTERFACE FOR MODIFYING DEPTH MAPS

(75) Inventors: Wa James Tam, Orleans (CA); Carlos Vázquez, Gatineau (CA)

(73) Assignee: Her Majesty the Queen in Right of Canada as represented by the Minister of Industry, Through the Communications Research Centre Canada, Ottawa (CA)

( * ) Notice: Subject to any disclaimer, the term of this patent is extended or adjusted under 35 U.S.C. 154(b) by 580 days.

(21) Appl. No.: 12/508,208

(22) Filed: Jul. 23, 2009

(65) Prior Publication Data

US 2010/0080448 A1    Apr. 1, 2010

Related U.S. Application Data

(63) Continuation-in-part of application No. 12/060,978, filed on Apr. 2, 2008.

(60) Provisional application No. 61/129,869, filed on Jul. 25, 2008, provisional application No. 60/907,475, filed on Apr. 3, 2007.

(51) Int. Cl.
    *G06K 9/00* (2006.01)
(52) U.S. Cl. ...................................... 382/162
(58) Field of Classification Search .................. 382/100, 382/154, 162, 165, 285, 294; 345/418–419, 345/473; 348/36, 81; 352/57
See application file for complete search history.

(56) References Cited

U.S. PATENT DOCUMENTS

| | | | |
|---|---|---|---|
| 4,641,177 A | 2/1987 | Ganss | 358/3 |
| 4,925,294 A | 5/1990 | Geshwind et al. | 352/57 |
| 6,215,516 B1 | 4/2001 | Ma et al. | 348/43 |
| 6,249,286 B1 * | 6/2001 | Dyer | 345/419 |
| 6,590,573 B1 | 7/2003 | Geshwind | 345/419 |
| 6,791,598 B1 * | 9/2004 | Luken et al. | 348/36 |
| 6,927,769 B2 * | 8/2005 | Roche, Jr. | 345/419 |
| 7,035,451 B2 | 4/2006 | Harman et al. | 382/154 |
| 7,054,478 B2 | 5/2006 | Harman | 382/154 |
| 7,148,889 B1 * | 12/2006 | Ostermann | 345/419 |
| 7,180,536 B2 | 2/2007 | Wolowelsky et al. | 348/42 |
| 7,187,809 B2 * | 3/2007 | Zhao et al. | 382/285 |
| 7,262,767 B2 | 8/2007 | Yamada | 345/419 |
| 7,477,779 B2 | 1/2009 | Graves et al. | 382/162 |

(Continued)

OTHER PUBLICATIONS

K. T. Kim, M. Siegel, & J. Y. Son, "Synthesis of a high-resolution 3D stereoscopic image pair from a high-resolution monoscopic image and a low-resolution depth map," Proceedings of the SPIE: Stereoscopic Displays and Applications IX, vol. 3295A, pp. 76-86, San Jose, Calif., U.S.A., 1998.

(Continued)

*Primary Examiner* — Jose Couso
(74) *Attorney, Agent, or Firm* — Teitelbaum & MacLean; Neil Teitelbaum; Doug MacLean

(57) ABSTRACT

The invention relates to a method and a graphical user interface for modifying a depth map for a digital monoscopic color image. The method includes interactively selecting a region of the depth map based on color of a target region in the color image, and modifying depth values in the thereby selected region of the depth map using a depth modification rule. The color-based pixel selection rules for the depth map and the depth modification rule selected based on one color image from a video sequence may be saved and applied to automatically modify depths maps of other color images from the same sequence.

19 Claims, 13 Drawing Sheets

U.S. PATENT DOCUMENTS

| | | | |
|---|---|---|---|
| 2005/0053276 A1 | 3/2005 | Curti et al. | 382/154 |
| 2006/0056679 A1 | 3/2006 | Redert et al. | 382/154 |
| 2006/0232666 A1 | 10/2006 | Op de Beeck et al. | 348/51 |
| 2007/0024614 A1 | 2/2007 | Tam et al. | 345/419 |
| 2007/0146232 A1 | 6/2007 | Redert et al. | 345/6 |
| 2008/0247670 A1 | 10/2008 | Tam et al. | 382/298 |
| 2008/0260288 A1 | 10/2008 | Redert | 382/285 |

OTHER PUBLICATIONS

J. Flack, P. Harman, & S. Fox, "Low bandwidth stereoscopic image encoding and transmission," Proceedings of the SPIE: Stereoscopic Displays and Virtual Reality Systems X, vol. 5006, pp. 206-214, Santa Clara, Calif., USA, Jan. 2003.

L. MacMillan, "An image based approach to three dimensional computer graphics", Ph. D. dissertation, University of North Carolina, 1997.

L. Zhang & W. J. Tam, "Stereoscopic image generation based on depth images for 3D TV," IEEE Transactions on Broadcasting, vol. 51, pp. 191-199, 2005.

W.J. Tam, "Human Factors and Content Creation for Three-Dimensional Displays", Proceedings of The $14^{th}$ International Display Workshops (IDW'07), Dec. 2007, vol. 3, pp. 2255-2258.

Redert et al. "Philips 3D solutions: from content creation to visualization", Proceeding of the Third International Symposium on 3D Data Processing, Visualization, and Transmission (3DPVT'06), University of North Carolina, Chapel Hill, USA, Jun. 14-16, 2006.

"Dynamic Digital dDepth (DDD) and Real-time 2D to 3D conversion on the ARM processor", DDD Group plc., White paper, Nov. 2005.

\* cited by examiner

METHOD AND GRAPHICAL USER INTERFACE FOR MODIFYING DEPTH MAPS

CROSS-REFERENCE TO RELATED APPLICATIONS

The present invention claims priority from U.S. Provisional Patent Application No. 61/129,869 filed Jul. 25, 2008, entitled "Method and Graphical User Interface for Modifying Depth Maps", which is incorporated herein by reference, and is a continuation in part of a U.S. patent application Ser. No. 12/060,978, filed Apr. 2, 2008, entitled "Generation Of A Depth Map From A Monoscopic Color Image For Rendering Stereoscopic Still And Video Images", which claims priority from U.S. Provisional Patent Application No. 60/907,475 filed Apr. 3, 2007, entitled "Methods for Generating Synthetic Depth Maps from Colour Images for Stereoscopic and Multiview Imaging and Display", which are incorporated herein by reference for all purposes.

TECHNICAL FIELD

The present invention generally relates to methods and systems for generating depth information for monoscopic two-dimensional color images, and more particularly relates to a computer implanted method and a computer program product for modifying depth maps based on color information contained in monoscopic images.

BACKGROUND OF THE INVENTION

Stereoscopic or three-dimensional (3D) television (3D-TV) is expected to be a next step in the advancement of television. Stereoscopic images that are displayed on a 3D-TV are expected to increase visual impact and heighten the sense of presence for viewers. 3D-TV displays may also provide multiple stereoscopic views, offering motion parallax as well as stereoscopic information.

A successful adoption of 3D-TV by the general public will depend not only on technological advances in stereoscopic and multi-view 3D displays, but also on the availability of a wide variety of program contents in 3D. One way to alleviate the likely lack of program material in the early stages of 3D-TV rollout is to find a way to convert two-dimensional (2D) still and video images into 3D images, which would also enable content providers to re-use their vast library of program material in 3D-TV.

In order to generate a 3D impression on a multi-view display device, images from different view points have to be presented. This requires either multiple input views consisting of camera-captured images or rendered images based on some 3D or depth information. This depth information can be either recorded, generated from multiview camera systems or generated from conventional 2D video material. In a technique called depth image based rendering (DIBR), images with new camera viewpoints are generated using information from an original monoscopic source image and its corresponding depth map containing depth values for each pixel or groups of pixels of the monoscopic source image. These new images then can be used for 3D or multiview imaging devices. The depth map can be viewed as a gray-scale image in which each pixel is assigned a depth value representing distance to the viewer, either relative or absolute. Alternatively, the depth value of a pixel may be understood as the distance of the point of the three-dimensional scene represented by the pixel from a reference plane that may for example coincide with the plane of the image during image capture or display. It is usually assumed that the higher the gray-value (lighter gray) associated with a pixel, the nearer is it situated to the viewer.

A depth map makes it possible to obtain from the starting image a second image that, together with the starting image, constitutes a stereoscopic pair providing a three-dimensional vision of the scene. The depth maps are first generated from information contained in the 2D color images and then both are used in depth image based rendering for creating stereoscopic image pairs or sets of stereoscopic image pairs for 3D viewing. In the rendering process, each depth map provides the depth information for modifying the pixels of its associated color image to create new images as if they were taken with a camera that is slightly shifted from its original and actual position. Examples of the DIBR technique are disclosed, for example, in articles K. T. Kim, M. Siegel, & J. Y. Son, "Synthesis of a high-resolution 3D stereoscopic image pair from a high-resolution monoscopic image and a low-resolution depth map," Proceedings of the SPIE: Stereoscopic Displays and Applications IX, Vol. 3295A, pp. 76-86, San Jose, Calif., U.S.A., 1998; and J. Flack, P. Harman, & S. Fox, "Low bandwidth stereoscopic image encoding and transmission," Proceedings of the SPIE: Stereoscopic Displays and Virtual Reality Systems X, Vol. 5006, pp. 206-214, Santa Clara, Calif., USA, January 2003; L. Zhang & W. J. Tam, "Stereoscopic image generation based on depth images for 3D TV," IEEE Transactions on Broadcasting, Vol. 51, pp. 191-199, 2005.

Advantageously, based on information from the depth maps, DIBR permits the creation of a set of images as if they were captured with a camera from a range of viewpoints. This feature is particularly suited for multiview stereoscopic displays where several views are required.

One problem with conventional DIBR is that accurate depth maps are expensive or cumbersome to acquire either directly or from a 2D image. For example, a "true" depth map can be generated using a commercial depth camera such as the ZCam™ available from 3DV Systems, Israel, that measures the distance to objects in a scene using an infra-red (IR) pulsed light source and an IR sensor sensing the reflected light from the surface of each object. Depth maps can also be obtained by projecting a structured light pattern onto the scene so that the depths of the various objects could be recovered by analyzing distortions of the light pattern. Disadvantageously, these methods require highly specialized hardware and/or cumbersome recording procedures, restrictive scene lighting and limited scene depth.

Although many algorithms exist in the art for generating a depth map from a 2D image, they are typically computationally complex and often require manual or semi-automatic processing. For example, a typical step in the 2D-to-3D conversion process may be to generate depth maps by examining selected key frames in a video sequence and to manually mark regions that are foreground, mid-ground, and background. A specially designed computer software may then be used to track the regions in consecutive frames to allocate the depth values according to the markings This type of approach requires trained technicians, and the task can be quite laborious and time-consuming for a full-length movie. Examples of prior art methods of depth map generation which involve intensive human intervention are disclosed in U.S. Pat. Nos. 7,035,451 and 7,054,478 issued to Harman et al.

Another group of approaches to depth map generation relies on extracting depth from the level of sharpness, or blur, in different image areas. These approaches are based on realization that there is a relationship between the depth of an object, i.e., its distance from the camera, and the amount of blur of that object in the image, and that the depth information in a visual scene may be obtained by modeling the effect that a camera's focal parameters have on the image. Attempts have also been made to generate depth maps from blur without knowledge of camera parameters by assuming a general monotonic relationship between blur and distance. However, extracting depth from blur may be a difficult and/or unreliable task, as the blur found in images can also arise from other factors, such as lens aberration, atmospheric interference, fuzzy objects, and motion. In addition, a substantially same degree of blur arises for objects that are farther away and that are closer to the camera than the focal plane of the camera. Although methods to overcome some of these problems and to arrive at more accurate and precise depth values have been disclosed in the art, they typically require more than one exposure to obtain two or more images. A further disadvantage of this approach is that it does not provide a simple way to determine depth values for regions for which there is no edge or texture information and where therefore no blur can be detected.

A recent U.S. patent application 2008/0247670, which is assigned to the assignee of the current application and is by the same inventors, discloses a method of generation surrogate depth maps based on one or more chrominance components of the image. Although these surrogate depth maps can have regions with incorrect depth values, the perceived depth of the rendered stereoscopic images using the surrogate depth maps has been judged to provide enhanced depth perception relative to the original monoscopic image when tested on groups of viewers. It was speculated that depth is enhanced because in the original colour images, different objects are likely to have different hues. Each of the hues has its own associated gray level intensity when separated into its component color images and used as surrogate depth maps. Thus, the colour information provides an approximate segmentation of "objects" in the images, which are characterized by different levels of grey in the color component image. Hence the color information provides a degree of foreground-background separation. In addition, slightly different shades of a given hue would give rise to slightly different gray level intensities in the component images. Within an object region, these small changes would signal small changes in relative depth across the surface of the object, such as the undulating folds in clothing or in facial features. Because using color information to substitute for depth can lead to depth inaccuracies, in some cases the visual perception of 3D images generated using these surrogate depth maps can be further enhanced by modifying these depth maps by changing the depth values in selected areas.

Generally, regardless of the method used, depth maps generated from 2D images can contain objects and/or regions with inaccurate depth information. For example, a tree in the foreground could be inaccurately depicted as being in the background. Although this can be corrected by a user through the use of a photo editing software by identifying and selecting object/regions in the image and then changing the depth contained therein, this task can be tedious and time-consuming especially when this has to be done for images in which there are many different minute objects or textures. In addition, the need to manually correct all similar frames in a video sequence can be daunting. Furthermore, even though commercially available software applications for generating depth maps from standard 2D images can be used for editing of depth maps, they typically involve complex computations and require long computational time. For example, one commercial software allows for manual seeding of a depth value within an object of an image, followed by automatic expansion of the area of coverage by the software to cover the region considered to be within an "object," such as the trunk of a tree or the sky; however, where and when to stop the region-growing is a computationally challenging task. Furthermore, for video clips the software has to track objects over consecutive frames and this requires further complex computations.

Furthermore, having an efficient method and tools for modifying depth maps can be advantageous even when the original depth map sufficiently reflects the real depth of the actual scene from which the image or video was created, for example for creating striking visual effects. For example, just as a director might use sharpness to make a figure stand out from a blurred image of the background, a director might want to provide more depth to a figure to make it stand out from a receded background.

Accordingly, there is a need for efficient methods and systems for modifying existing depth maps in selected regions thereof.

In particular, there is a need to reduce computational time and complexity to enable the selection of pixels and regions to conform to object regions such that they can be isolated and their depth values adjusted, for improved contrast or accuracy. Being able to do that manually for one image frame and then automatically repeat the process for other image frames with similar contents is a challenge.

An object of the present invention is to provide a relatively simple and computationally efficient method and a graphical user interface for modifying existing depth maps in selected regions thereof for individual monoscopic images and monoscopic video sequences.

SUMMARY OF THE INVENTION

Accordingly, one aspect of the invention provides a method for modifying a depth map of a two-dimensional color image for enhancing a 3D image rendered therefrom. The method comprises: A) obtaining a first color image and a depth map associated therewith containing depth values for pixels of the first color image; B) displaying at least one of the first color image and the depth map on a computer display; C) selecting a depth adjustment region (DAR) in the depth map for modifying depth values therein; and D) generating a modified depth map by modifying the depth values in the DAR using a selected depth modification rule. The step (D) of generating a modified depth includes: a) receiving a first user input identifying a first pixel color within a range of colors of a target region in the first color image; b) upon receiving a second user input defining a pixel selection rule for selecting like-coloured pixels based on the first pixel color, using said pixel selection rule for identifying a plurality of the like-coloured pixels in the first color image; c) displaying a region visualization image (RVI) representing pixel locations of the plurality of like-coloured pixels; d) repeating steps (b) and (c) to display a plurality of different region visualization images corresponding to a plurality of different color selection rules for selection by a user; and, e) identifying a region in the depth map corresponding to a user selected region visualization image from the plurality of different region visualization images, and adopting said region in the depth map as the DAR.

An aspect of the present invention further provides a method for modifying depth maps for 2D color images for enhancing 3D images rendered therewith, comprising: a) selecting a first color image from a video sequence of color images and obtaining a depth map associated therewith, wherein said video sequence includes at least a second color image corresponding to a different frame from a same scene and having a different depth map associated therewith; b) selecting a first pixel color in the first color image within a target region;

c) determining pixel locations of like-coloured pixels of the first color image using one or more color selection rules, the like-coloured pixels having a pixel color the same as the first pixel color or in a specified color tolerance range thereabout; d) applying a selected depth modification rule to modify the depth map of the first color image at depth map locations corresponding to the pixel locations of the like-coloured pixels to obtain a modified depth map of the first color image; e) applying the one or more color selection rules and the selected depth modification rule to identify like-coloured pixels in the second color image of the video sequence and to modify the depth map of the second color image at depth map locations corresponding to the pixel locations of the like-coloured pixels in the second color image to obtain a modified depth map of the second color image; f) outputting the first and second color images and the modified depth maps associated therewith for rendering an enhanced video sequence of 3D images; and, wherein the one or more color selection rules and the selected depth modification rule are obtained based on the first color image.

One feature of the present invention provides a graphical user interface (GUI) for modifying depth maps of color images or sequences of color images, which provides GUI tools for displaying the first color image, the region visualization image, the depth map, and the modified depth map on the computer screen, and for receiving the first and second user inputs, and for saving the pixel selection rule and the selected depth modification rule obtained using the first color image for use in modifying depth maps of other color images.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
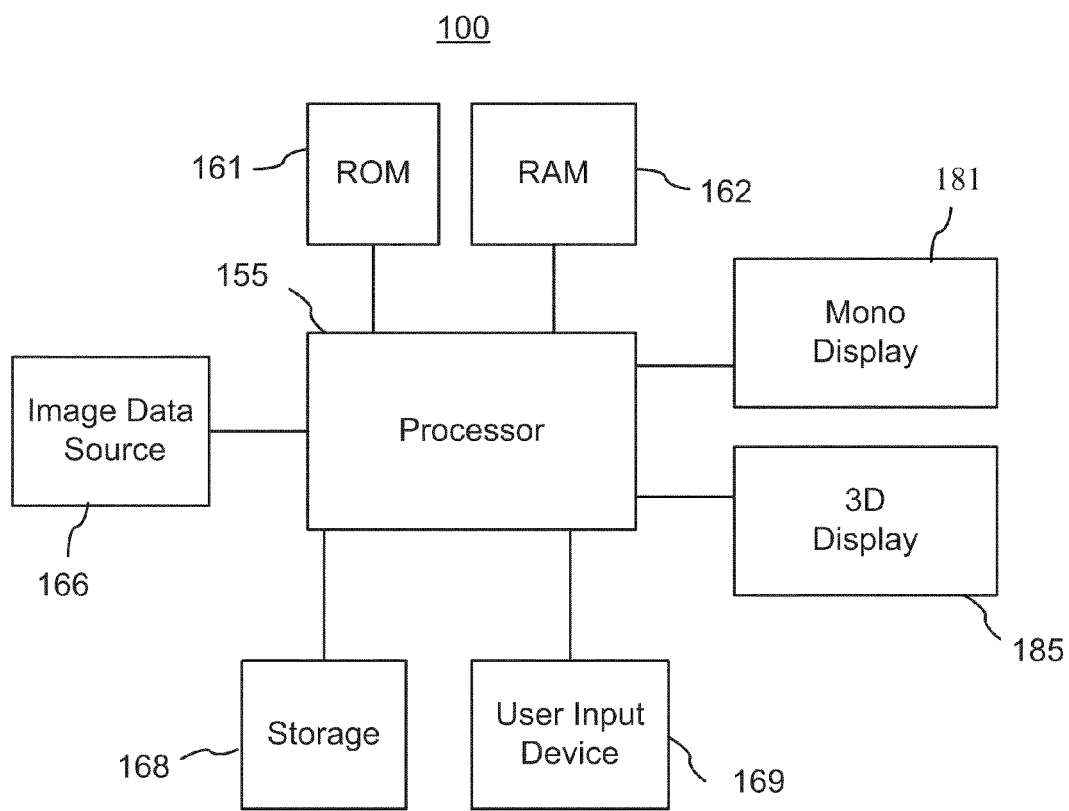
FIG. 1 is a general representation of a computer system that can be used in the present invention.

The invention will be described in connection with a number of exemplary embodiments. To facilitate an understanding of the invention, many aspects of the invention are described in terms of sequences of actions to be performed by functional elements of a video-processing system. It will be recognized that in each of the embodiments, the various actions including those depicted as blocks in flow-chart illustrations and block schemes could be performed by specialized circuits, for example discrete logic gates interconnected to perform a specialized function, by computer program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention may be embodied in many different forms, and all such forms are contemplated to be within the scope of the invention.

In the context of the present specification the terms "monoscopic color image" and "2D color image" or "two-dimensional color image" are used interchangeably to mean a picture, typically digital and two-dimensional planar, containing an image of a scene complete with visual characteristics and information that are observed with one eye, such as luminance intensity, colour, shape, texture, etc. Images described in this specification are assumed to be composed of picture elements called pixels and can be viewed as two-dimensional arrays or matrices of pixels, where the term "array" is understood herein to encompass matrices. A depth map is a two-dimensional array of pixels each assigned a depth value indicating the relative or absolute distance from a viewer or a reference plane to a part of an object in the scene that is depicted by the corresponding pixel or block of pixels. A depth map may be represented as a 2D grey-scale digital image wherein grey-level intensity of each pixel represents a depth value. The term "color component", when used with reference to a color image, means a pixel array wherein each pixel is assigned a value representing a partial color content of the color image. A color component of a monoscopic color image can also be viewed as a gray-scale image. Examples of color components include any one or any combination of two of the RGB color components of the image, or a chrominance component of the image in a particular color space. The term "deviated image," with respect to a source image, means an image with a different viewpoint from the source image of a given scene. A deviated image and a source image may form a stereoscopic image pair; two deviated images with different viewpoints may also form a stereoscopic pair. The larger the difference in deviation the larger the depth of objects will be depicted in the scene.

The present invention provides a computer-implemented method for selecting pixels and regions within a depth map (DM) for depth modification based on color, or a range of a color tone or shade, that is selected from an associated 2D color image of the same visual scene. The intensity values of pixels in thereby selected areas of the DM are then modified, so as to either correct the depth information or to create a desired perceptual effect with stereoscopic images that are generated with the depth map. As an example, when there is an error in the depth map such that pixels associated with an object/region are incorrectly placed in the foreground, it is then desirable to have the object/region moved back by reducing the intensity level of the pixels for that object/region. The depth values can be corrected by selecting pixels associated with the object/region using the method of this invention and then applying modifications to the gray-level intensities for those pixels. As another example, by choosing to increase the intensities of the pixels in a sequence of depth maps that are associated with an object moving out of the screen in a video sequence, the final perceived depth is that of the object moving faster and farther out from the screen towards the viewer than if the intensities were not increased. Thus, there is more visual impact with the stereoscopic image sequence that is rendered with the adjusted depth maps.

Another aspect of the invention provides a graphical user interface (GUI) for modifying the depth maps, which may be advantageously used in implementing the method of the present invention. The GUI provided herein incorporates various features and tools for modifying the gray-level intensities of the selected pixels and regions of the depth map with a new intensity value, a gradient of intensity values, or a selected function of the pixel coordinate and/or original depth values. The GUI also enables global changes of the pixel intensity values of the depth map based on modifications of one or more of the histograms of the intensity values associated with the depth map itself and/or the color components of the associated color image. The GUI also provides tools for making global changes in the depth map by transforming the color space of the color image in the case that the gray-level intensity image frame is directly derived from one of its chrominance components, for example using method disclosed in the U.S. Patent Application No. 2008/0247670 assigned to the assignee of the present application and in the names of the inventors of the present application, which is incorporated herein by reference. In addition to global changes using the aforementioned method, the GUI enables local areas of a depth map that is derived from a color component to be modified. The GUI enables to store parameters and list of steps undergone in modifying the intensity values of the DM so that the same parameters and processing steps can be retrieved and applied to a range of frames with similar visual contents, such as with consecutive images in a video sequence that are located between scene cuts. In one embodiment of the GUI, four image windows provide the user with a view of the original color image, the original unadjusted depth map, a region visualization image (RVI) indicating the region(s) in the DM or the associated monoscopic color image that are selected for adjustment or modification of pixel intensities of the DM, and a modified depth map wherein pixel intensities, i.e. depth values, are modified in the selected regions so as to provide an enhanced 3D image. Other secondary windows may also be provided within the GUI, for example depicting histogram distributions. Graphical sliders for adjustments, drop down menus, input and selection boxes constitute other important elements of the interface that provide various features and tools for interactive modification of the depth maps.

With reference to FIG. 1, an embodiment of a computer system 100 suitable for implementing the present invention is illustrated. A processor 155 is connected to ROM 161, RAM 162, and a storage device 168, which can be a hard disk drive, compact disc (CD) drive, optical drive, and the like. The processor 155 executes a software program for generating a graphical user interface (GUI) of the present invention that may be stored in ROM 161 or storage 168, and for implementing the method of the present invention for modifying the depth maps in response to user input obtained by means of the GUI. The processor 155 provides output signals to a computer display 181, which is suitable for displaying monoscopic color and grey-scale images and which is hereinafter also referred to as the display 181, for displaying elements of the GUI for implementing the present invention. The processor 155 may also include a software or hardware module implementing a depth image based rendering (DIBR) algorithm to render 3D images, for example in the form of stereoscopic image pairs (SIP), based on the MCIs and their associated depth maps, and may be connected to provide output signals to a stereoscopic display 185, for displaying the rendered 3D images. A user input device 169 can be a mouse, jog/shuttle controller, keyboard, or other suitable input device connected to the processor 155, or a combination of two or more of the above, connected to the processor 155 to provide user input as described in detail hereinbelow. The processor 155 is connected to an image data source 166 for receiving therefrom image or video data in the form of monoscopic color images together with their associated depth maps. The image data source 166 may be in the form of a storage device such as a hard disk drive, a DVD drive, a CD drive or alike, which may be separate from or shared with the storage device 168, or may be in the form of a network card or a video card for receiving the image or video data from a remote server via a network or a video cable connection.

Figure 2:
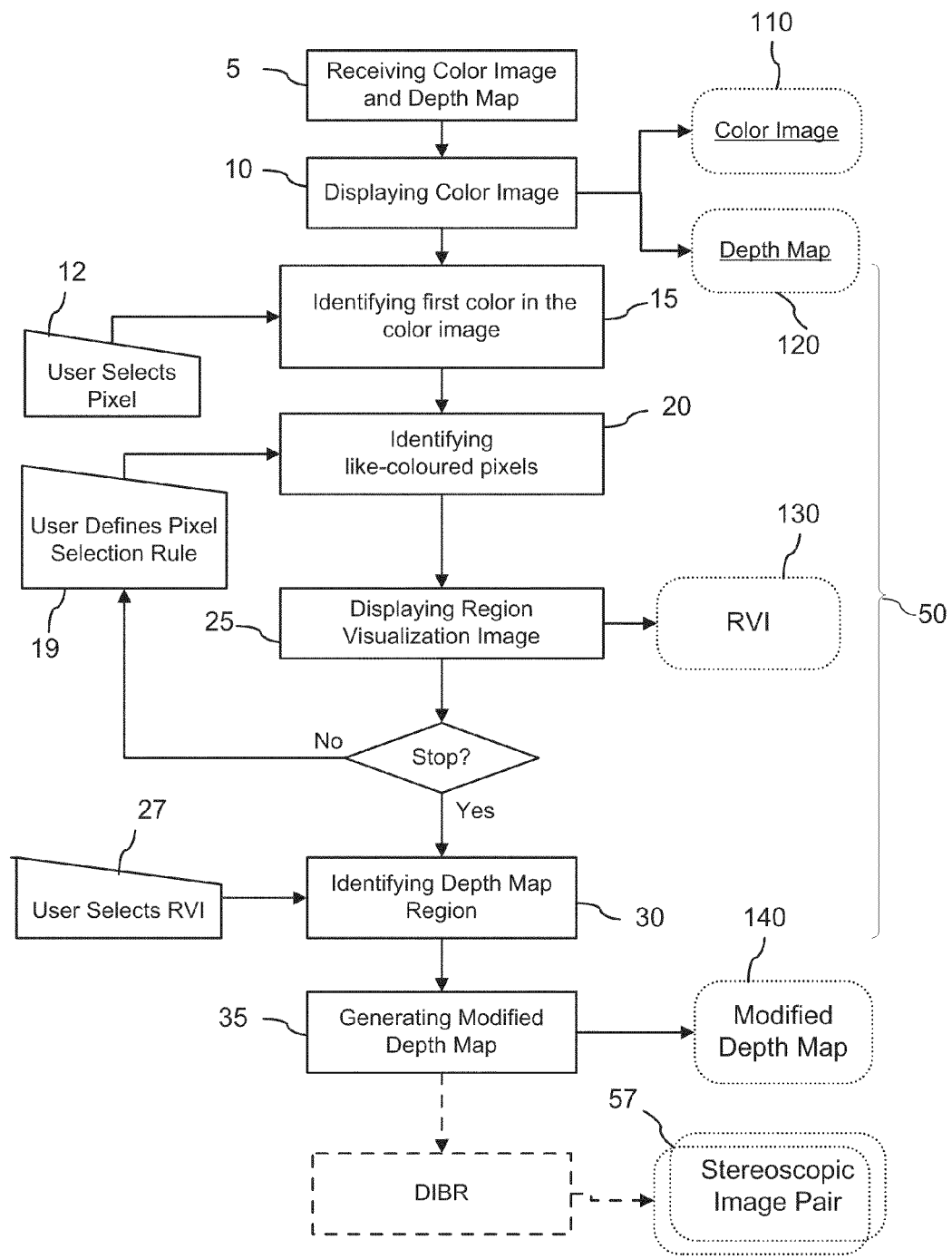
FIG. 2 is a flowchart of a method of modifying a depth map according to the present invention.
Figure 5:
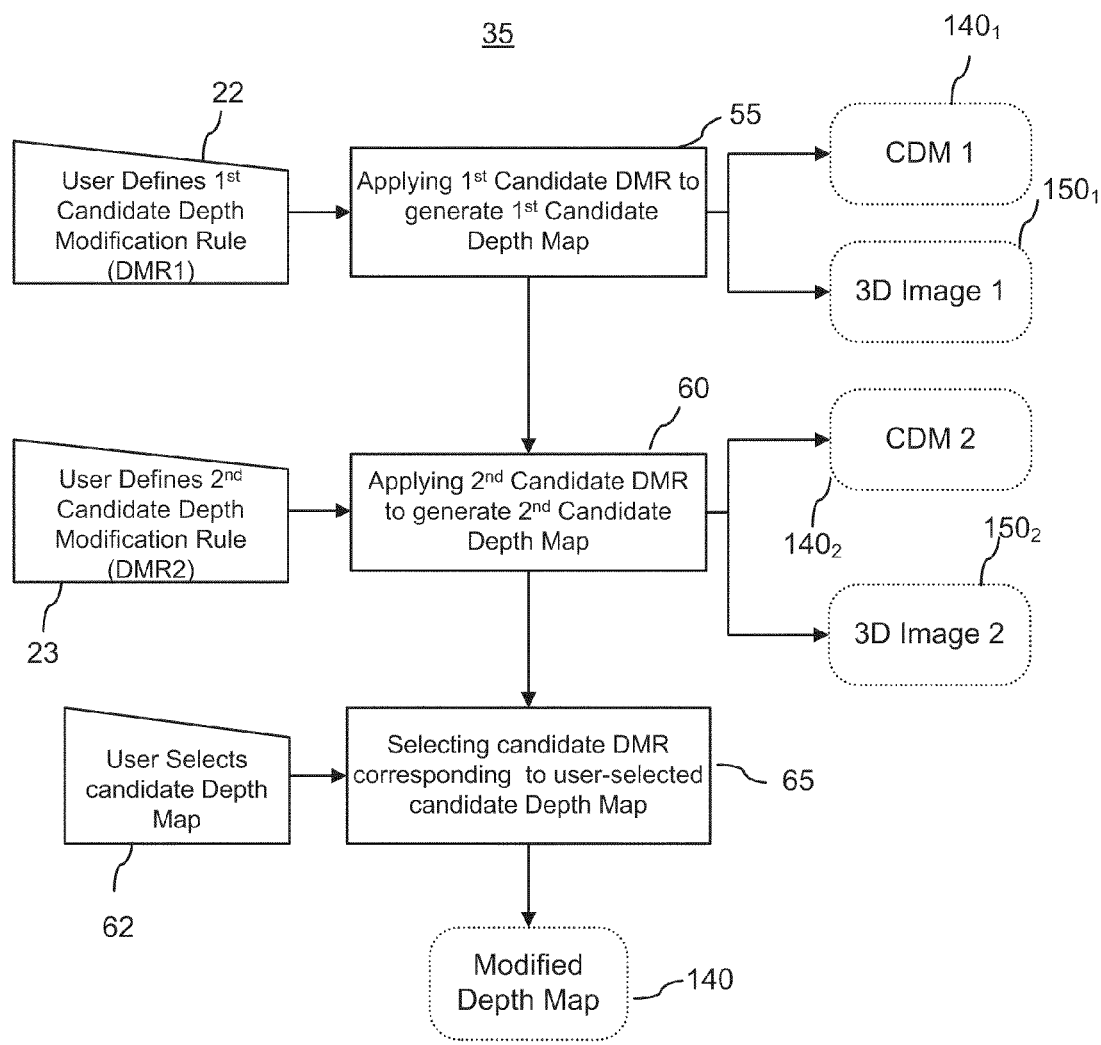
FIG. 5 is a flowchart of interactively selecting the depth modification rule for modifying depth values in the DAR according to one embodiment of the present invention.
Figure 6:
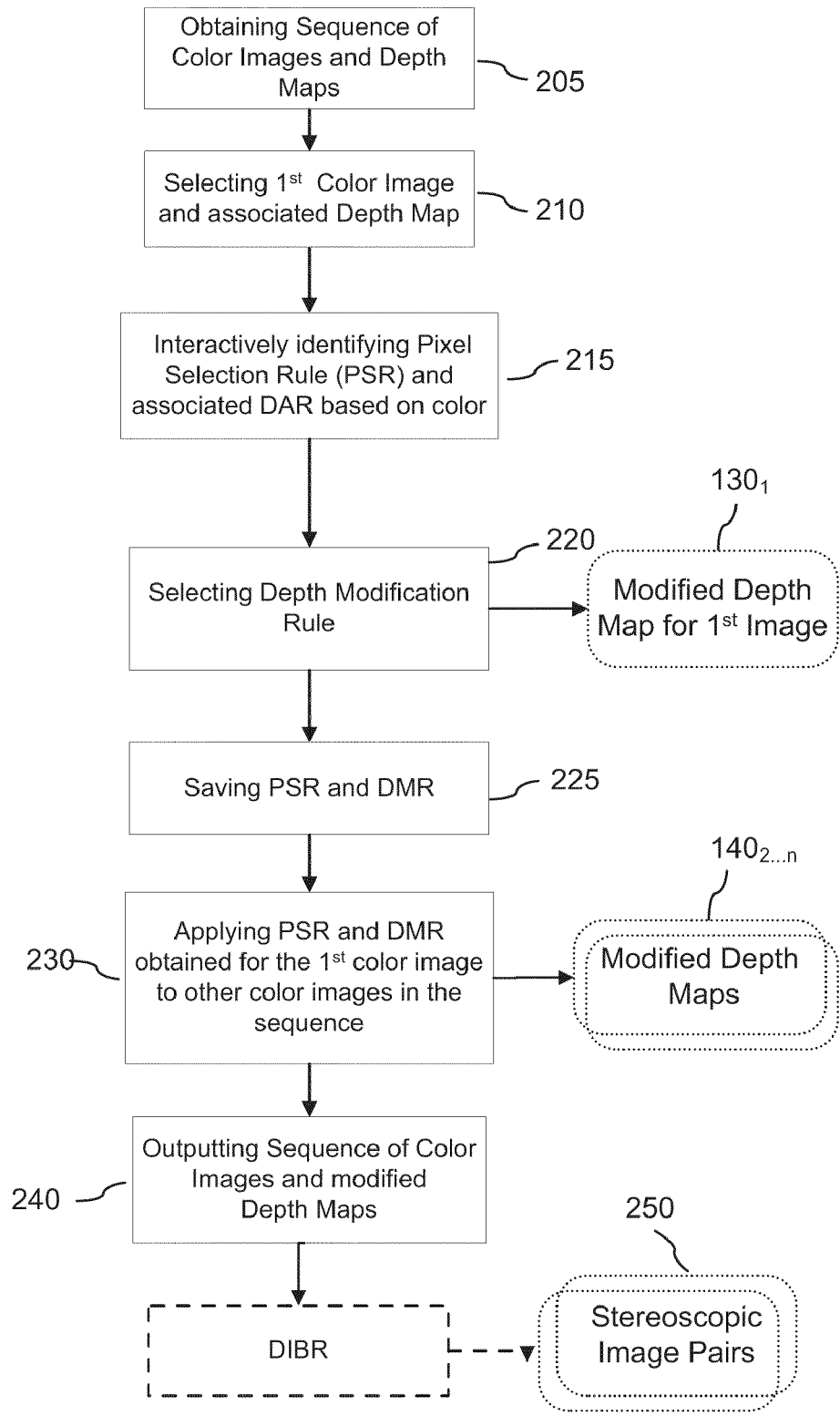
FIG. 6 is a flowchart of a method of modifying depth maps of a video sequence of color images according to one embodiment of the present invention.

Flowcharts shown in FIGS. 2, 5 and 6 illustrate exemplary embodiments of a method of the present invention for interactively modifying a depth map of a monoscopic color image for enhancing a 3D image rendered therefrom; these embodiments will now be described with reference to the computer system 100 shown in FIG. 1 and with reference to an illustrative GUI 300 for implementing the method of the present invention illustrated in FIG. 3.

With reference to FIG. 2, there are illustrated exemplary steps of a method 1 for interactively modifying a depth map 120 of a monoscopic color image (MCI) 110 for enhancing a 3D image rendered therefrom according to one embodiment of the present invention. The MCI 110 will also be referred to hereinafter as the first color image or simply as the color image 110, and the depth map (DM) 120 will also be referred to as the original depth map to distinguish it from a modified depth map (MDM) 140 that is generated as an output of the method 1. The method 1, which can be used for modifying depth maps associated with either still or video 2D color images, may be implemented in the form of computer instructions adapted to be executed by the processor 155.

In the shown embodiment, the method 1 starts with obtaining at step 5 the monoscopic color image 110 and the original depth map 120 associated therewith, which contains depth values for pixels of the first color image 110. This step may include receiving the MCI 110 and, optionally, the DM 120 from the image data source 166, or receiving the MCI 110 from the image data source 168, and generating the original DM 120 for this image with the processor 155 using a suitable depth map generation method. In a next step 10, the color image 110 is displayed on the computer display 181 to be viewed by a user; in a currently preferred embodiment, the original depth map 120 may also be simultaneously displayed on the computer display 120, for assisting the user in making selections as described hereinbelow, however embodiments of the method may be envisioned wherein either the original depth map 120 or the MCI 110 is not displayed. In some embodiments, this step may include displaying with the 3D display 185 a 3D image using a stereoscopic image pair (SIP) generated based on the MCI 110 and the depth map 120 by a DIBR algorithm implemented in the processor 155.

Next, an iterative process 50 is used to interactively identify a depth adjustment region (DAR) in the depth map 120 for modifying depth values therein based on a color or range of colors as obtained using the MCI 110.

The user may visually identify a general region in the MCI 110, or the depth map 120, or the corresponding 3D image rendered therewith, corresponding to an object for which depth is to be modified relative to other objects depicted in the MCI 110 to enhance the 3D image, for example by correcting for an error in the original depth map 120, or to generate a desired visual effect. Although the user may have a general perception of the region to be modified, it is a tedious, labor-intensive and time consuming task to manually tag each and every pixel in the region in the depth map for which the depth value, i.e. intensity, is to be modified; this task becomes especially unmanageable if it has to be performed on each frame of a video sequence.

In an embodiment of FIG. 2, the DAR identification process 50 is performed interactively and iteratively using steps 15, 20, 25 and 30 aided by the GUI 300 as described hereinbelow. These steps include:

a) receiving in step 15 a first user input 12 identifying a user selected pixel color, hereinafter referred to as the first selected color or first pixel color, within a range of colors of the target region in the first color image;

b) upon receiving a second user input 19 defining a pixel selection rule (PSR) for selecting like-colored pixels based on the pixel color of the user selected pixel, i.e. the first selected color, using said pixel selection rule in step 20 for identifying a plurality of the like-colored pixels in the first color image 110;

c) in step 25, displaying a region visualization image (RVI) representing pixel locations, in either the depth map 120 or the MCI 110, of the plurality of like-colored pixels;

d) interactively repeating steps 20 and 25 to sequentially display a plurality of different RVIs corresponding to a plurality of different color selection rules for selection by the user; and, e) upon selection by the user at 27 of one region visualization image from the plurality of different region visualization images, identifying in step 30 a region in the depth map 120 corresponding thereto, and adopting said region in the depth map 120 as the DAR for saving thereof in memory.

Advantageously, this interactive region selection process 50 not only identifies the DAR in the depth map, but also, as described hereinbelow, generates pixel selection rules for selecting the DAR in the depth map, which can then be applied to automatically to select depth modification regions representing the same object or objects in depth maps of other video frames of the same video sequence, such as in the video sequence relating to a same scene.

Once the DAR in the depth map 120 is identified, the modified depth map 140 is generated in step 35 by modifying the depth values for pixels in the DAR using a selected depth modification rule, which may include performing, or instructions to perform, one or more operations on pixel values in the DAR. Using the MDM 140, the DIBR algorithm implemented in the processor 155 may then optionally generate an improved stereoscopic image pair (SIP) 57, which may then be displayed to the user as the enhanced 3D image with the 3D display 185.

Figure 3:
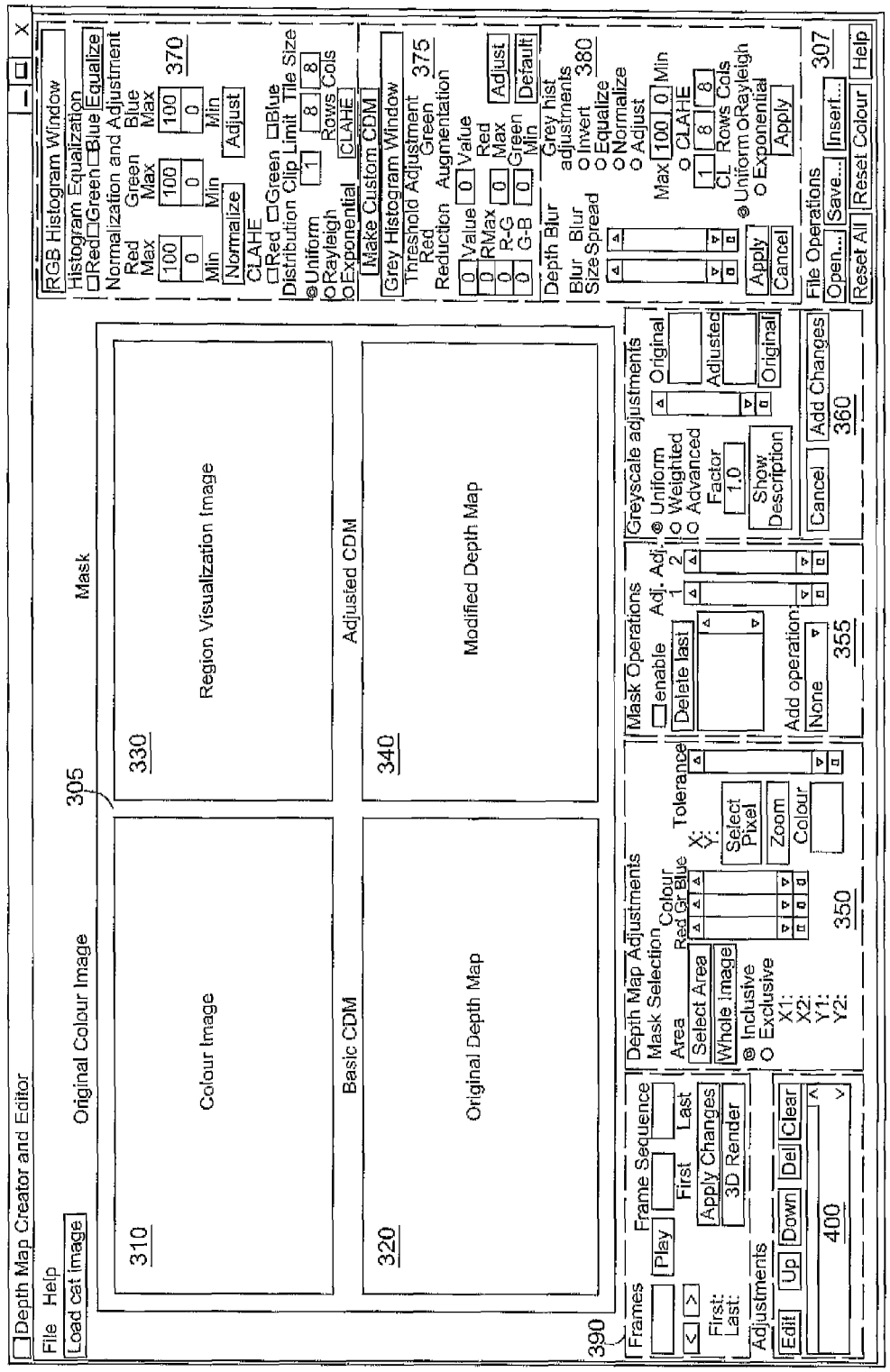
FIG. 3 is a general view of the graphical user interface for modifying a depth map according to one embodiment of the present invention.

With reference to FIG. 3, the GUI 300 is herein illustrated according to one embodiment of the invention; it provides GUI tools for implementing the interactive method for the depth map modification outlined hereinabove with reference to FIG. 2. A main viewing area 305 includes a first viewing area 310 for displaying the MCI 110, a second viewing area 320 for optionally displaying the original depth map 120 associated with the MCI 110 shown in the first viewing area 310, a third viewing area 330 for displaying the RVI 130 in step 25, and a fourth viewing area 340 for displaying the modified depth map 140 that is generated in step 35, or candidate depth maps as described hereinbelow. The viewing areas 310, 320, 330 and 340 will also be referred to hereinafter as windows. The GUI 300 also includes a file operations area 307, and user input areas (UIA) 350, 355, 360, 370, 375, 380, 390, and 400. A first user input area 350 includes GUI tools for receiving the second user input 19, including GUI tools for selecting and adjusting color tolerance ranges as described hereinbelow. A second user input area 355 includes GUI tools for manipulating the RVI such as hole-filling and blooming and inversion, a third user input area 360 includes GUI tools for receiving user input for gray-level intensity operations within DMRs, fourth and fifth user input areas 370, 380 include GUI tools for performing color editing operations upon the MCI 110 and grey level adjustment of the DM 120, respectively. The sixth user input area 390 includes GUI tools for specifying the range of image frames for processing in a sequence and for specifying the rendering of images with new camera viewpoints. The user input area 400 includes a window and user input tools for displaying and editing a list and order of operations to be performed on pixels of the depth map in the DAR. These user input areas of the GUI 300 are descried more in detail hereinbelow with reference to FIGS. 7 to 11.

Figure 8:
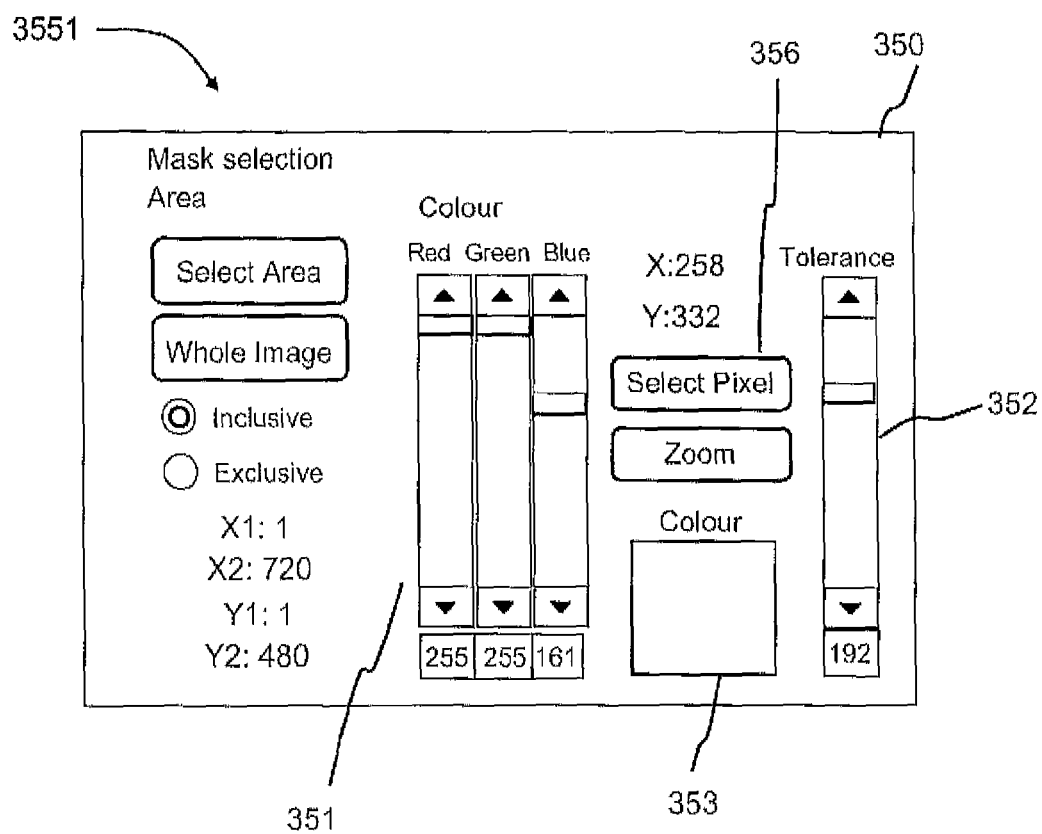

In the GUI 300, the first user input 12 may be in the form of a selection by the user of a location in the viewing areas 310 and 320 by means of a pointing device such as computer mouse, wherein by moving a pointer to a specific location with the computer mouse and pressing a mouse button communicates to the processor 155 coordinates of the selected pixel in the respective image, which may then be recorded in memory. If the selection is made in the DM 120, the processor 155 then uses pre-defined MCI-DM mapping rules to identifies a location in the MCI 110 corresponding to the user selected location in the DM 120, and vice versa. The GUI 300 further includes alternative pixel selection tools such as edit windows enabling direct input by the user of pixel coordinates of the selected pixel either in the MCI 110 or in the depth map 120. Accordingly, the first user input 12 may include the user selecting, for example with the pointing device, a location either directly in the MCI 110 displayed in the viewing area 310, or by selecting a location in the depth map 120 displayed in the viewing area 320, in which case step 15 includes identifying a pixel in the MCI 110 corresponding to the selected location in the depth map 120, or by specifying color components of the first selected color directly using such GUI tools as sliders 351 (FIG. 8)

In one embodiment, step 15 includes determining n color component values for the user selected pixel, said n color component values defining the pixel color in a selected color space, wherein $n \geq 2$. In another embodiment, the first user input may directly specify the first selected color by directly specifying the respective color component values. For this purpose, the GUI 300 provides tools, such as sliders 351 (see FIG. 8), for specifying each of the color components individually, and a window 353 (see FIG. 8) for displaying the resulting color to provide visual feedback to the user indicating whether the selected color corresponds to a color of the object for which depth is to be modified. The pixel selection rule obtained from the user with the second user input in step 20 may include user-defined color tolerance ranges of the n color component values about the values of respective color component obtained in step 15, with step 20 including applying these user defined color tolerance ranges to identify the like-colored pixels.

Generally, a variety of color models, or spaces, may be used for representing colors of the MCI 110, such as RGB, HSV, L*a*b*, YUV, Y'CbCr, CYMK, etc., in most of which n=3, so that the color of each pixel is defined by three color component values. The RGB (Red, Green, Blue) color space represents a color with a red component (R), a green component (G) and a blue component (B). In a three-dimensional coordinate system, each of the R, G, and B components of the RGB color space represents a value along an axis, the combination of the values defining a color. The R, G, and B may refer to the tristimulus values of red, green, and blue that are combined to create the colour image on a display, which may be gamma-corrected. For digital video signals in component format, the Y'CbCr color system is typically used; the Y'CbCr color space represents a color with a gamma-corrected luma component Y', and two chroma components, Cr and Cb, which are obtained by subtracting the luma component Y' from the red component R and the blue component B, respectively. The color components may have other scale factors and offsets applied to them, depending on the video signal scheme used. Chroma subsampling may be used wherein the luminance component representing brightness is provided with a higher resolution than the chroma components.

In the exemplary embodiment described herein, the pixel color is defined by the R, G, and B color values. Accordingly, the first user input may specify the first selected color in terms of three RGB values $(R_1 G_1 B_1)$ hereinafter referred to as the first RGB values, while the second user input may include providing user-specified color tolerance ranges $\Delta R$, $\Delta G$ and $\Delta B$ of the R, G and B color values about the first RGB values $(R_1 G_1 B_1)$ of the first selected color. In one embodiment of the GUI 300, the user-specified color tolerance ranges $\Delta R$, $\Delta G$ and $\Delta B$ are obtained using the first RGB values $(R_1 G_1 B_1)$ and a single color tolerance value $\Delta$, so that the color tolerance ranges of the R, G and B components for selecting the like-colored pixels are defined as $(R_1-\Delta, R_1+\Delta)$ for the R component, $(G_1-\Delta, G_1+\Delta)$ for the G component, and $(B_1-\Delta, B_1+\Delta)$ for the B component. Once the first selected color is specified by the user, the GUI 300 displays the RVI 130 in the third viewing area 330, which represents a patch of the selected colour from the MCI 110, to provide a visual feedback to the user as to the size and shape of a region in the depth map 120 that will be modified. To provide a flexibility in the selection of a larger or smaller region of pixels in the depth map, the GUI 300 provides a tool, such as a slider 352 (see FIG. 8), to change the color tolerance value $\Delta$ and to adjust the range of shades or other dimensions of the chosen color to be incorporated into the selection. The GUI 300 also provides a tool for image processing of the RVI and includes hole-filling within regions and blooming to enlarge regions.

FIGS. 4(a)-(d) illustrate by way of example the interactive process of selecting a DAR in the depth map 120 based on a color from pixels the target region in the MCI 110. In the example illustrated therein, the color image 110 shown in FIG. 4(a) includes a feature or a region 115 having a specific color which changes its shade or tone towards the edges of the region, as represented in the figure by concentric rings with differing shadings. The depth map 120 as originally obtained is a grey-scale image wherein the feature 115 is not suitably pronounced, as schematically represented by a uniform shading of the depth map 120 in FIG. 4(b). The user may want to bring this feature or region, hereinafter referred to as the target region or feature, to the foreground in a corresponding 3D image to enhance it. The present invention facilitates the identification of all pixels of the DAR 180 in the depth map 120 that suitably matched the target object, so that respective depth values in the DAR 180 may be suitably modified.

Figure 4:
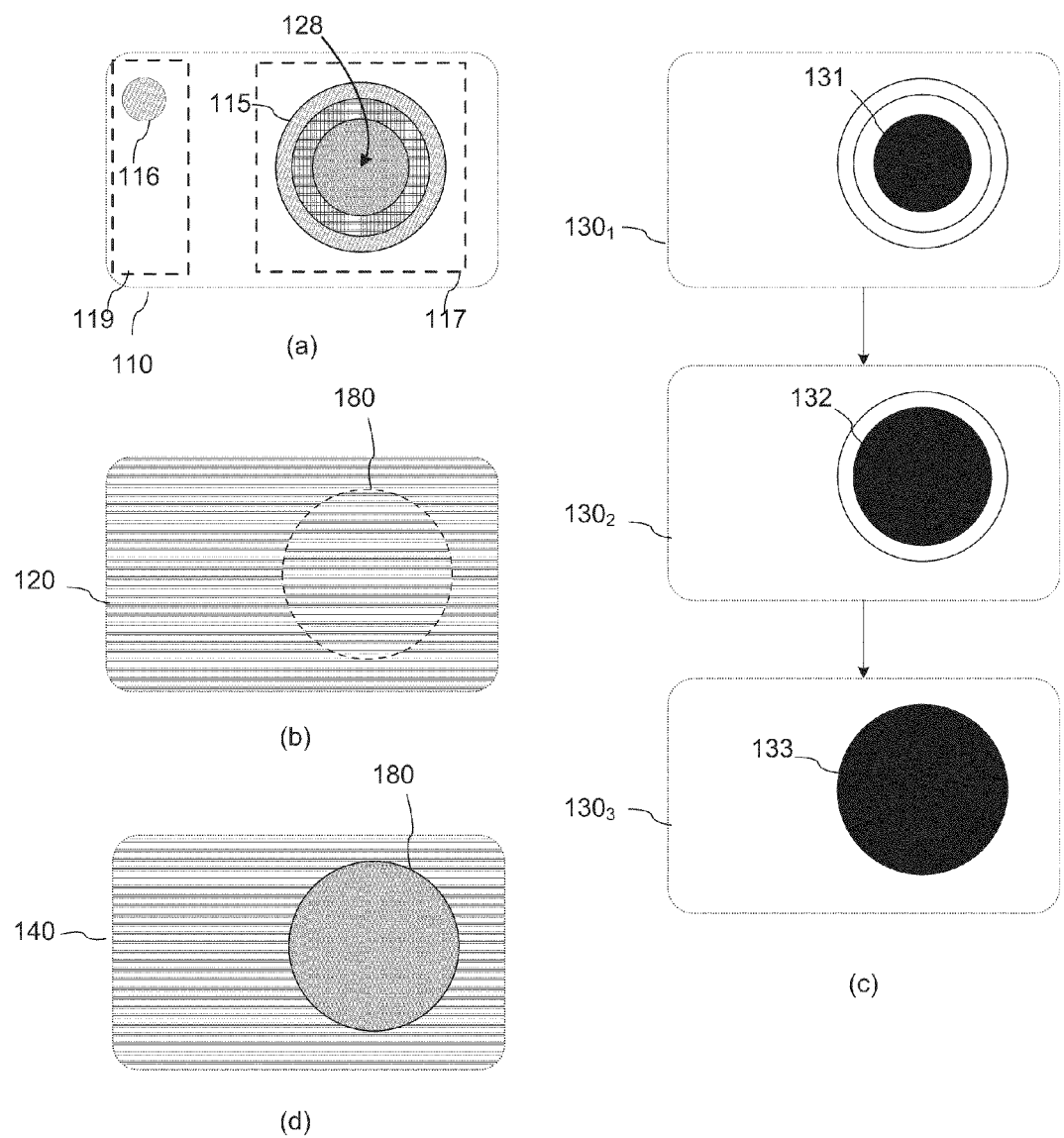
FIG. 4 is a diagram illustrating the process of selecting the depth adjustment region (DAR) in the depth map according to one embodiment of the present invention.

FIG. 4(c) illustrates an RVI sequence $130_1$, $130_2$, $130_3$ which may be displayed at step (25) in the window 330 of the GUI 300 in three consecutive iterations of the interactive process 50 of selecting, in response to the first user input 12, a suitable plurality of the like-colored pixels. In a first iteration, the user may select a pixel in the centre area of the region 115 to determine the first selected color. For example, the RGB values for the first selected color in the center of region 115 in the MCI 110 may be 200, 155, 120. Upon the determination of the first selected color, the RVI $130_1$ is displayed showing a single feature 131, hereinafter referred to as a mask feature, indicating the locations of all pixels in the MCI 110 having the first selected color, or the locations of corresponding pixels in the DM 120. The mask feature 131 is however visibly smaller than the feature 115 in the MCI 110, so that in a next iteration the second user input may provide a first color tolerance value $\Delta_1=5$ to define a pixel selection rule according to which all pixels in the MCI 110 having R values in the range 200±5, G values in the range 155±5, and B values in the range 120±5 are included in the plurality of like-colored pixels. The third window 330 of the GUI 300 may then display the RVI $130_2$ wherein the locations of the new expanded plurality of like-colored pixels are indicated with the feature 132. Since the feature 132 is still visibly smaller than the feature 115 in the MCI 110, in the next iterations the second user input may update the PSR by increasing the color tolerance value, for example to $\Delta_2=9$, so as to include in the plurality of like-colored pixels all pixels in the MCI 110 having R values in the range 200±$\Delta_2$, G values in the range 155±$\Delta_2$, and B values in the range 120±$\Delta_2$. The iterations may continue until the RVI 130 displayed in the third window 330 of the GUI 300, or at least a portion thereof, is congruent in shape and size with the target feature 115 of the MCI 110, as illustrated by the mask feature 133 of the RVI $130_3$, at which point a plurality of pixels in the DM 120 corresponding to the current mask feature 133, and thus to the current plurality of like-colored pixels, is adopted as the DAR 180. Once the DAR 180 is identified, a modified depth map 140 may be generated in step 35 by modifying the depth values in the DAR 180 of the original depth map 120 using a selected depth modification rule.

There may be other pixels or groups of pixels in the MCI 110, unrelated to the target feature 115 but having a pixel color in the selected color range, and which thus may be included in the plurality of like-colored pixels if the pixel selection rule is applied to all pixels of the MCI 110. Advantageously, in one embodiment of the invention step 20 of identifying the plurality of like-colored pixels may be performed so as to exclude pixels of a second region in the first color image 110 from the plurality of pixels defining the mask feature. In another embodiment, step 20 of identifying the plurality of like-colored pixels may include defining a third region in the first color image 110 encompassing the target region 115, and then determining pixel locations of the like-colored pixels while excluding pixels outside of the third region.

By way of example, MCI 110 shown in FIG. 4(a) includes a second feature 116 having the same pixel color as pixels of the target region 115 near the edges thereof. Accordingly, the user may define the second region 119, for example by defining a simple geometrical shape such as a rectangle or a circle, or by defining a contour that may be drawn free-hand by the user moving a pointer with the mouse or alike as known in the arts, that encompasses the second feature 116 but not the target feature 115, with step 20 of identifying the like-colored pixels being performed so as to exclude pixels of the second region 119 from the selection.

Alternatively, the user may define the third region 117, that may also be of a simple geometrical shape such as a rectangle or a circle, which encompasses the target feature 115 but not the second feature 116, with step 20 of identifying the like-colored pixels being performed so as to include only pixels from the third region 117 in identifying like-colored pixels for the DAR selection process.

In one embodiment of the present invention wherein the first color image 110 corresponds to one frame in a video sequence of frames representing a scene, the position of the third region may be made to effectively track a position of the target object 115. In this embodiment, the method includes the steps of saving a user-selected PSR obtained for the first image in computer readable memory, and applying the saved PSR to identify like-colored pixels in specified regions of color images corresponding to other frames from the sequence. The method may further include specifying a rule for defining the specified regions, such as the third region 117, within each frame relative to a position of the plurality of like-colored pixels within said frame as determined using the saved PSR. In one embodiment, this may include a) saving the position of the third region obtained for the MCI 110 in memory; b) for a next frame, i) using a known in the art method to determine a center 128 of the plurality of like-colored pixels identified using the saved PSR and the saved position of the third region, ii) if the position of the center 128 has changed relative to the saved position thereof, moving the center of the third region towards the new center of the like-colored pixels.

In one embodiment of the invention, the color-based PSR, in addition to defining the color tolerance ranges for identifying the like-colored pixels, may also define one or more image editing operations that are to be applied to the MCI 110 prior to applying the color tolerance ranges in order to improve the DAR selection process. These image editing operations may be applied independently to each color channel in order to affect the way like-colored pixels are selected in the selection process 50. The image editing operations may include, but are not limited to, color normalization, color adjustment, and color histogram manipulation. These operations effectively change the range of values that can take each of the color components in the MCI 110.

By way of example, the color normalization operation receives a minimum value and a maximum value of a selected color component from the GUI 300, and then maps the values in that color channel to the range of colors defined by these minimum and maximum values. The example that is implemented uses a linear mapping to perform the normalization, for example based on the following equation (1):

$$C' = \frac{(C - C_m)}{(C_M - C_m)}(C'_M - C'_m) + C'_m \qquad (1)$$

where C refers to a color component, i.e. R, G or B, C' refers to a normalized color component, and the subscripts m and M refer respectively to the minimum and maximum values of the corresponding variable.

Figure 11:
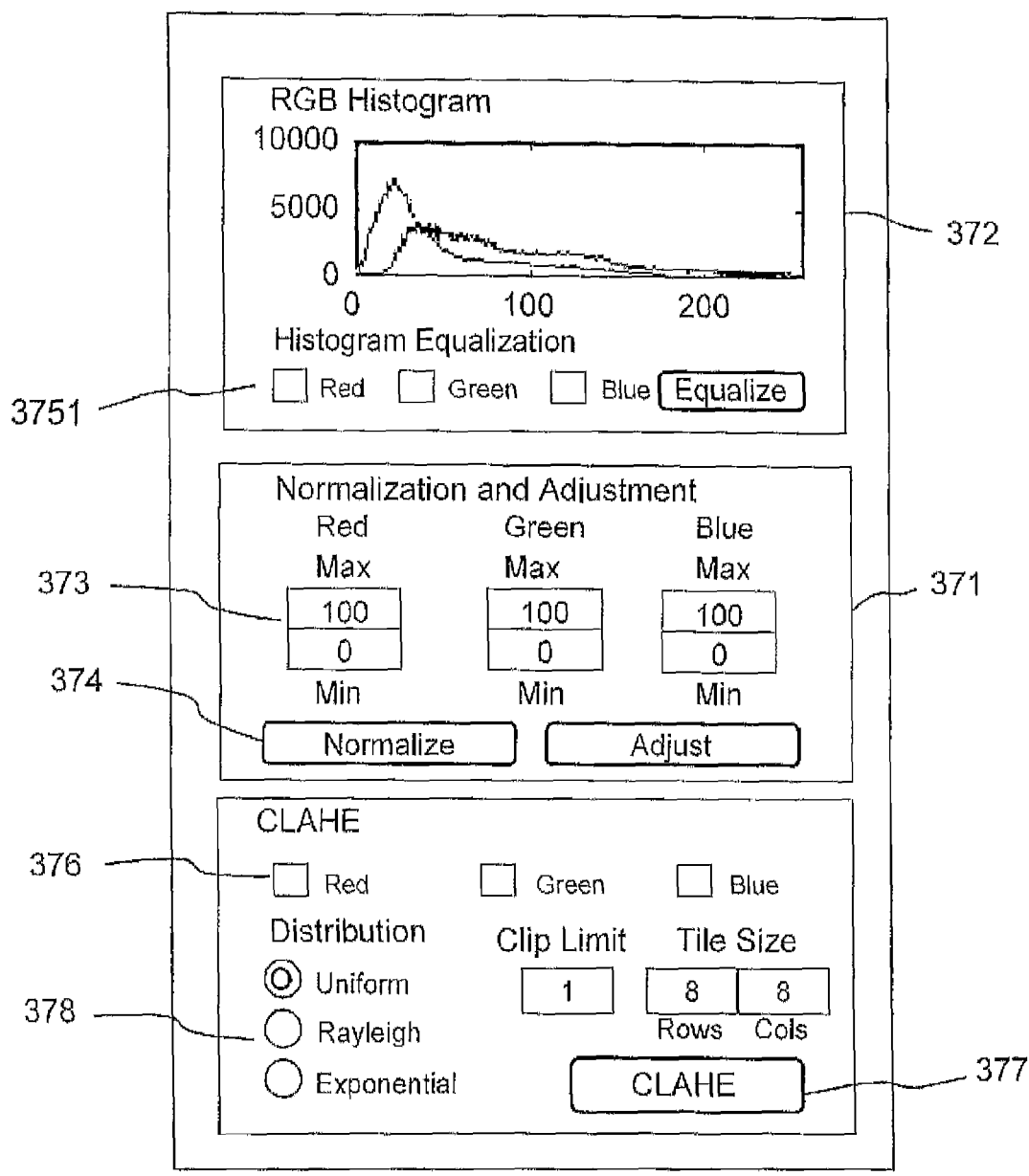

With reference to FIG. 11, the user input area 370 of the GUI 300 provides means, such as edit boxes 373, for the user to specify the $C_m$ and $C_M$ values for each of the three color components R, G and B. This operation may be applied independently to each color component.

The color normalization operation has the effect of changing the contrast for a given color component. The effect could be an improvement in contrast if the range of values for a given color component is expanded. This may enable a better precision in the selection of the color tolerance ranges in the definition of the DAR.

The color adjustment operation involves a mapping of the whole range of color values for a selected color component in the MCI 110 to a specified destination range. The destination range is specified by the user input of a minimum value $C'_m$ and a maximum value $C'_M$ in the edit boxes 373 in user input area 370 of the GUI 300. A color component selected by the user is first normalized to the range [0,1] and then remapped to the user specified range, for example based on the following equation (2):

$$C' = \frac{C}{255}(C'_M - C'_m) + C'_m \qquad (2)$$

This operation has the effect of contracting the range of the selected color component, reducing its contrast in the MCI 110. This can be useful for expanding the range of a particular color component in the selected color range defining the like-colored pixels. For example, the user could be interested in selecting a region in the MCI 110 with a large variation in the red component. By contracting the range of values of the red color component as presented in the MCI 110, the user can select the whole region with a small tolerance Δ.

Color adjusting operations may also be performed for the generation of the original depth map using the color-based technique disclosed in the published U.S. Patent Application No. 2008/0247670, since changes to the color component could lead to better-suited depth maps based on color.

By way of example, step 20 of identifying the like-colored pixels may further include the following steps:

i) Apply the color normalization operation to the MCI 110 for a first user-selected color component, e.g. red, with a user-specified range $[C_m\ C_M]$ for the red component, for example [0 60], using the GUI edit window 373; and, ii) Apply the color adjustment operation to the MCI 110 for a second user-selected color component, for example blue, with a user-specified range $[C'_m\ C'_M]$, for example [50 100]. Of course, the selection of particular color components and their adjusted ranges for the color adjustment or color normalization operations depends on the MCI 110.

The modified depth map 140 obtained using these operation may have a more uniform background region, allowing for a better selection of the background region for adjustment of the depth value.

With reference to FIG. 5, step 35 of generating the modified depth map 140 may be performed interactively and include i) obtaining at least two different candidate depth maps $140_1$ and $140_2$ by sequentially applying at least two different user-defined candidate depth modification rules (DMR) DMR1 and DMR2 to modify the depth map 120 at depth map locations defined by the selected region visualization image 130; ii) displaying at least one of: the at least two different candidate depth maps $140_1$ and $140_2$ on the computer display 181, or two different 3D images $150_1$ and $150_2$ generated therewith; and, iii) in response to a fourth user input, adopting a user selected candidate depth map $140_1$ or $140_2$ as the modified depth map 140, and adopting one of the at least two different candidate depth modification rules DMR1 and DMR2 corresponding to the user selected candidate depth map as the selected depth modification rule. The term "adopting" as used herein means saving as an output, or utilizing in consecutive steps of the method.

The candidate depth modification rules DMR1 and DMR2 may each include performing one or more operations on depth values of pixels of the DAR 180, such as but not limited to: adjusting pixel values of the depth map at locations defined by the region visualization image by a same value or in a same proportion; assigning a same new pixel value to each pixel within the DAR; and, applying a gradient to pixel values of the depth map at locations defined by the DAR. The DMRs may also include substituting the original depth values in the DAR with new depth values specified using one or more mathematical functions of the original depth value of a pixel and a user-specified value or range of values, and/or pixel coordinates GUI 300 provides in the user input area 360 user input tools for defining operations on pixels in the DAR, as described hereinbelow with reference to FIG. 9

Continuing to refer to FIG. 5, the first candidate depth modification rule DMR1, as defined by the user at user input 22, is applied to the DM 120 at step 55 to generate the first CDM $140_1$, which may be displayed to the user in window 340 to provide visual feedback. Simultaneously, or as decided by the user, the processor 155 may generate the 3D image $150_1$ to provide another feedback to the user. By way of example, DMR1 may include increasing all depth values within the DAR by 50% to bring the respective object to the forefront of the scene in the 3D image. Subsequently, the second candidate depth modification rule DMR2 my be defined by the user at user input 22, and applied to the DM 120 to generate the second CDM $140_2$ and, optionally, the second 3D image $150_2$ rendered using said second CDM, which may also be displayed to the user to provide feedback. By way of example, DMR2 may include increasing all depth values within the DAR by 90% to further bring the respective object to the forefront of the scene in the 3D image. The user may then select one of the candidate DMRs based on a selection between the first and second CDMs $140_1$, $140_2$ and/or the first and second 3D images $150_1$, $150_2$, and provide the third user input 62 indicating which of the two candidate DMRs, DMR1 or DMR2, to adopt as the selected depth modification rule. Alternatively, the last candidate DMR specified by the user may be adopted as the selected DMR, for example for use on other color images of the same scene.

One advantage of the present invention is that it enables to automate the depth map modification for depth maps associated with different frames of a video sequence representing a scene, using the pixel modification rule and the selected depth modification rule obtained using a single frame of the video sequence as the first image. This involves saving the color selection rule and the selected depth modification rule obtained based on the first image in computer readable memory, and applying the saved selected color selection and depth modification rules to identify pluralities of the like-colored pixels and modify their depth values for other frames in the video sequence.

Accordingly, one aspect of the present invention provides a method for modifying depth maps for 2D color images for enhancing 3D images rendered therewith, which includes the following general steps:

a) selecting a first color image from a video sequence of color images and obtaining a depth map associated therewith, wherein said video sequence includes at least a second color image corresponding to a different frame from a same scene and having a different depth map associated therewith;

b) selecting a first pixel color in the first color image within a target region;

c) determining pixel locations of like-colored pixels of the first color image using one or more color selection rules, the like-colored pixels having a pixel color the same as the first pixel color or in a specified color tolerance range thereabout; and, d) applying a selected depth modification rule to modify the depth map of the first color image at depth map locations corresponding to the pixel locations of the like-colored pixels to obtain a modified depth map of the first color image;

e) applying the one or more color selection rules and the selected depth modification rule to identify like-colored pixels in the second color image of the video sequence and to modify the depth map of the second color image at depth map locations corresponding to the pixel locations of the like-colored pixels in the second color image to obtain a modified depth map of the second color image; and, f) outputting the first and second color images and the modified depth maps associated therewith for rendering an enhanced video sequence of 3D images; and, wherein the one or more color selection rules and the selected depth modification rule are obtained based on the first color image. Referring now to FIG. 6, there is illustrates a method 1a for modifying depth maps of a video sequence of color images, such as a video sequence related to a same scene. The method 1a includes the following general steps:

At step 205, obtaining the sequence of color images and depth maps corresponding thereto. This step may involve, for example, reading the sequence of images and, optionally, the associated depth maps from the computer-readable memory such as the storage device 168, or may involve generating the depth map from the color images of the sequence.

Figure 7:
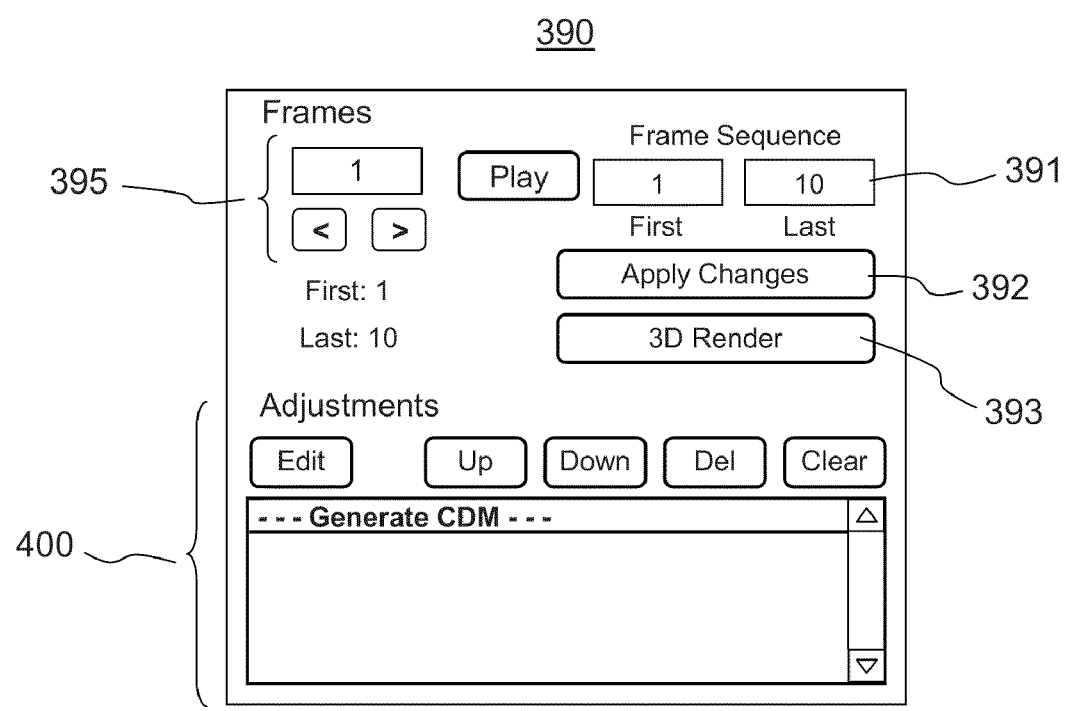
FIGS. 7-11 are diagrammatic views of various user input areas of the graphical user interface of FIG. 3.

At step 210, selecting the first color image 110 from the sequence of color images, and identifying the depth map 120 associated therewith. Note that the first color image 110 does not have to be the first in order in the sequence, and may generally be any color image from the sequence. as selected by the user using a frame selection tool 395 of the GUI 300 (FIG. 7).

At step 215, interactively identifying the pixel selection rule (PSR) and an associated DAR based on color of the first color image 110; this step may be performed, for example, using the DAR selection process 50 as described hereinabove with reference to FIG. 2 The pixel selection rule may include information defining the color tolerance ranges of the n color components for identifying the like-colored pixels, for example in the form of the three color component values $R_1$ $G_1$ $B_1$ defining the first selected color and the threshold value $\Delta$ defining the color tolerance, and an ordered list of image editing operations performed on the MCI 110, such as color adjustment, color normalization, and color histogram manipulation, At step 220, selecting a suitable depth modification rule, for example using the interactive process as described hereinabove with reference to FIG. 5.

At step 225, saving the pixel selection rule and depth modification rule obtained in steps 215 and 220 in computer-readable memory;

At step 230, applying the saved PSR and DMR obtained based on the first color image 110 to other color images in the sequence of color images and their associated depth maps to generate a modified depth map for each color image from the sequence of color images.

At step 240, outputting the sequence of color images and their associated modified depth maps, for example for saving in a computer readable memory, and/or to a DIBR processor for generating a sequence of stereoscopic image pairs therefrom, which can then be provided to the 3D display 185 for presenting to the user as a 3D video sequence.

GUI Tools

FIG. 3 illustrates one embodiment of the GUI 300 for modifying a depth map of a single color image or a plurality of depth maps associated with a sequence of color images. Various objects of the GUI 300 are associated with specific functional modules for performing various image, color and pixel processing operations as described herein, which may be implemented in the processor 155 for example, as software modules, firmware modules, or using dedicated hardware such as but not limited to FPGA, ASICS, and various types of computer-readable memory as known in the art. As stated hereinabove the GUI 300 includes a number of user input areas, which will now be described more in detail with reference to FIGS. 7-11 and in the context of the method of the present invention for modifying the depth maps of monoscopic color images.

Frame Operations Tools

The computer system 100 running the GUI 300 may accept as input a sequence of color images, also referred to as frames, from a digital video clip, and a sequence of original depth maps associated therewith. With reference to FIG. 7, the GUI 300 includes the user input area 390, which provides various user input tools (UIT), also referred to herein as controls, and associated edit windows 391-395 for frame selection and frame operations, including edit windows and frame selection controls 391 and 395.

The user input area 400 provides GUI tools, such as control buttons and scroll window, for selection of operations on the RVI such as dilation, erosion, opening, and closing, and alike, and for indicating options on how to adjust gray-level pixel intensities in the depth maps of the frames for pixels/areas within the DAR.

According to one feature of the invention, the computer system 100 running the GUI 300 may accept as input a feature-length movie sequence. The processor 155 may execute a computer program that divides the input video sequence into a series of short clips by identifying scene cuts for partitioning, using known in the art methods such as by checking for large changes, for example of mean luminance, texture or color, between two consecutive frames or series of frames. The short clips will consist of image frames that contain similar contents, thereby allowing for automatic adjustments based on the saved PSR and DMR obtained based on the MCI 110.

In operation, one image frame from the input sequence is selected by the user using frame selection controls 395 and displayed in the first window 310 of the GUI 300 with the computer display 181. The depth map 120 for the selected first color image 110 is displayed in the second window 320. In some embodiments, the depth map 120 may be generated by the processor 155 using any suitable method of depth map generation from a selected color image or frame, including the method that was disclosed in the US patent application 2008/0247670 "Generation of a depth map from a monoscopic color image for rendering stereoscopic still and video images." The user input area 375 of the GUI 300 provides controls for the depth map generation based on a color component of the selected image.

FIG. 8 shows the user input area 350 which includes tools to select the plurality of like-colored pixels for defining the DAR. In particular, there are provided tools for specifying the first selected color, such as sliders 351 for directly specifying the RGB components of the first selected color, and a pixel selection control 356; tools for specifying the color tolerance value $\Delta$ such as slider 352, and a mask selection area 3551 providing UITs for restricting an area of the MCI 110 where the like-colored pixels are selected for as described hereinabove with reference to FIG. 4(a). In the shown embodiment, these tools enable to specify a rectangular area in the MCI 110 defined by four sets of coordinates (X1,Y1), (X2,Y2), (X3, Y3), (X4,Y4) which may be either included or excluded in the selection of like-colored pixels to determine the DAR. Locations of the like-colored pixels selected using the settings defined herein in the MCI 110 or in the depth map 120 may be displayed as the mask feature in the third window 330, or in either the first window 310 or the second window 320 to be superimposed upon either the MCI 110 or the depth map 120 for ease of comparison with the feature targeted for depth adjustment. The coordinates of the exclusion or inclusion region need not be static when applied to a video sequence of images, when the saved processing steps for the first color image are applied to other frames of the video sequence related to a same scene. The parameters for deciding and specifying which region is to be excluded or included in the determination of the DAR for each frame may be derived from any one or a combination of suitable means as known in the art, including but not limited to object tracking algorithms.

Figure 9:
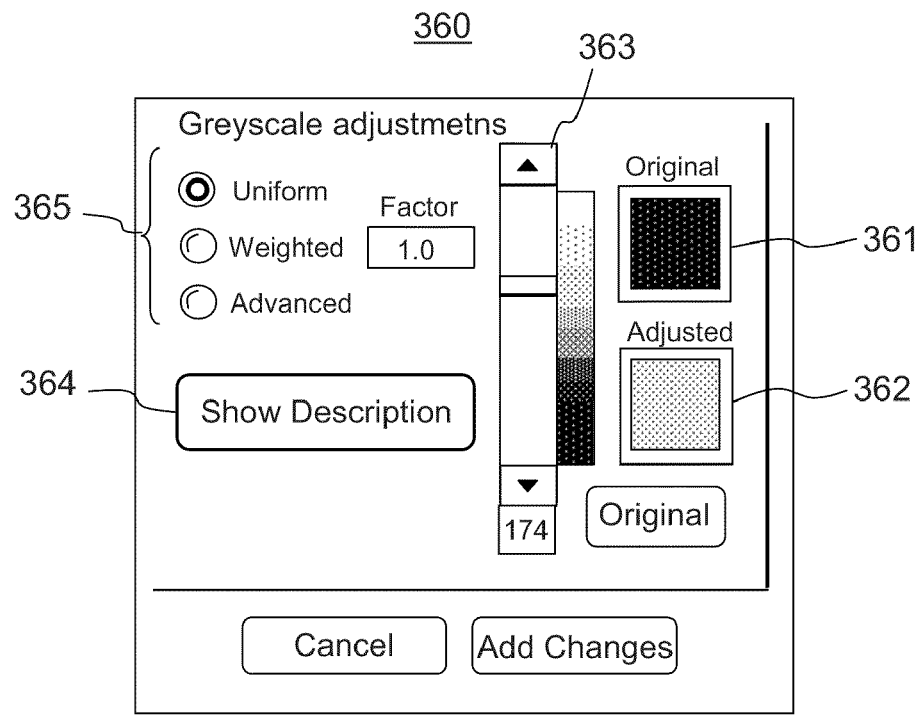

FIG. 9 shows the user input area 360 of the GUI 300, which provides user input tools for adjusting the gray-level intensities of pixels in the depth map within the DAR, as defined by the settings in the user input area 350. These tools include the slider 363 for varying the grey level intensity within the DAR by adjusting the slider position, an input window for directly inputting a desired intensity level, and controls 365 for switching between uniform, weighted and advanced distribution functions for the grey level intensity, i.e. depth values, within the DAR. Windows 361 and 362 display grey-level intensities in the DAR in the original and modified depth masks, respectively.

When the advanced option is selected using controls 365, the user input control 364 of the GUI 300 provides a new menu and control tools that enable the user to specify a gradient of gray level intensities to be applied within the DAR. Specifically, the specified gray level intensity can be modified to produce a gradient of intensities along any direction in the depth map by specifying the orientation and the beginning and end of an arrow. This can, for example, be used for modifying image regions depicting areas such as the ground, so that pixels in the depth map decreasing in intensity values are to appear to the viewer higher up towards the distance horizon in the middle of an image. In other words, in depicting a ground surface, pixels in the bottom regions of the modified depth map 140 should have a high intensity value that gradually decreases along the vertical dimension, or y co-ordinate, of the depth map image.

Figure 10:
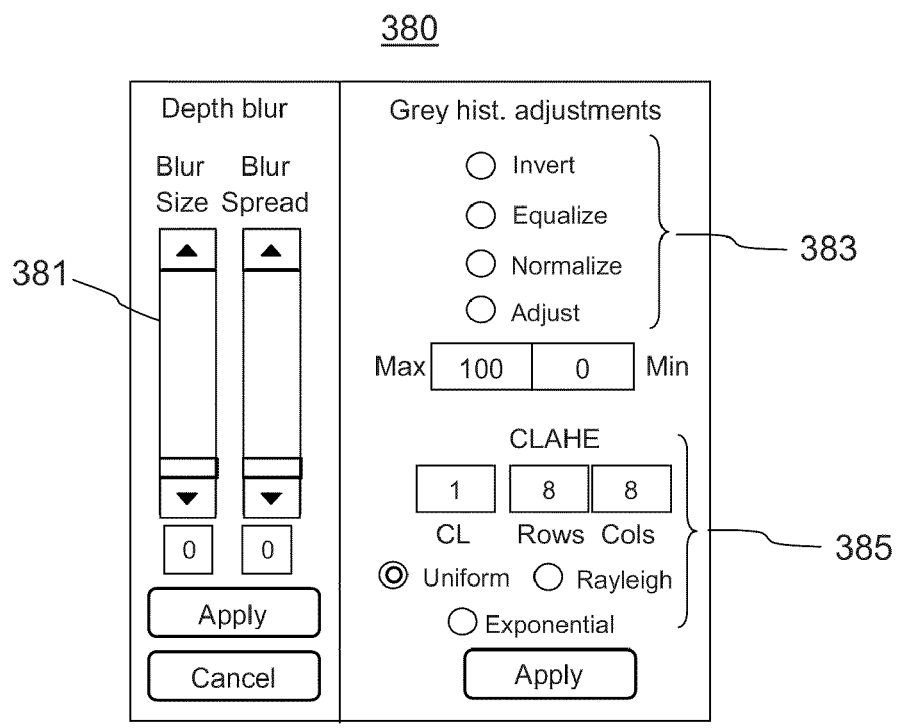

FIG. 10 shows the user input area 380 of the GUI 300, which provides user input tools for adjusting the histogram distribution of the gray-level intensities of the whole depth map 120 to be modified by standard methods known in the art. For example, user controls 383 enable grey-level histogram adjustment by grey-level inversion, normalization, equalization, and gamma correction. User controls 385 enable contrast-limited adaptive histogram equalization (CLAHE) of the grey-level histogram of the depth map. Sliders 381 enable specification of the parameters of a Gaussian filter for smoothing the MDM 140. Furthermore, when the "adjust" option is exercised, the GUI 300 also provides tools in a new menu for manual adjustments of a graphical continuous curve depicting the gray-level intensities against pixel frequency.

FIG. 11 shows the user input area 370 of the GUI 300, which provides tools for performing color correction of individual color channels R, G and B. In the shown embodiment, it includes a group of tools 372 for performing equalization of the histogram distribution of the intensity levels of one or more of the RGB color components of the MCI 110, with selection windows 371 for selecting the color component to equalize. It further includes parameter input windows 373 and controls 374 for performing color component normalization and adjustment as described hereinabove. It further includes a group of controls 3751 for performing the contrast-limited adaptive histogram equalization (CLAHE) of individual color components, including RGB selection windows 376, and controls 378 for selecting a desired distribution type from pre-defined options.

Advantageously, the GUI 300 enables to iterate the process of selecting the like-colored pixels and changing the gray-level intensities in the DAR of the depth map, thereby accumulating layers of depth modifications. After each iteration of the depth map modification, the cumulative effect of the altered depth map is displayed in the fourth window 340 for the user to examine whether the depth map changes are as intended. User input area 400 enables the selected depth modification operations to be reordered and undesired operations to be deleted.

The options and the steps that were selected to modify the depth values through adjustments of the grey-level intensity of pixels in the DAR are recorded in memory and are then applied to the selected range of consecutive images from the input video sequence to generate the modified depth maps for those images. The modified depth maps are then saved to be used in rendering of stereoscopic image pairs to generate enhanced 3D images.

Figure 14:
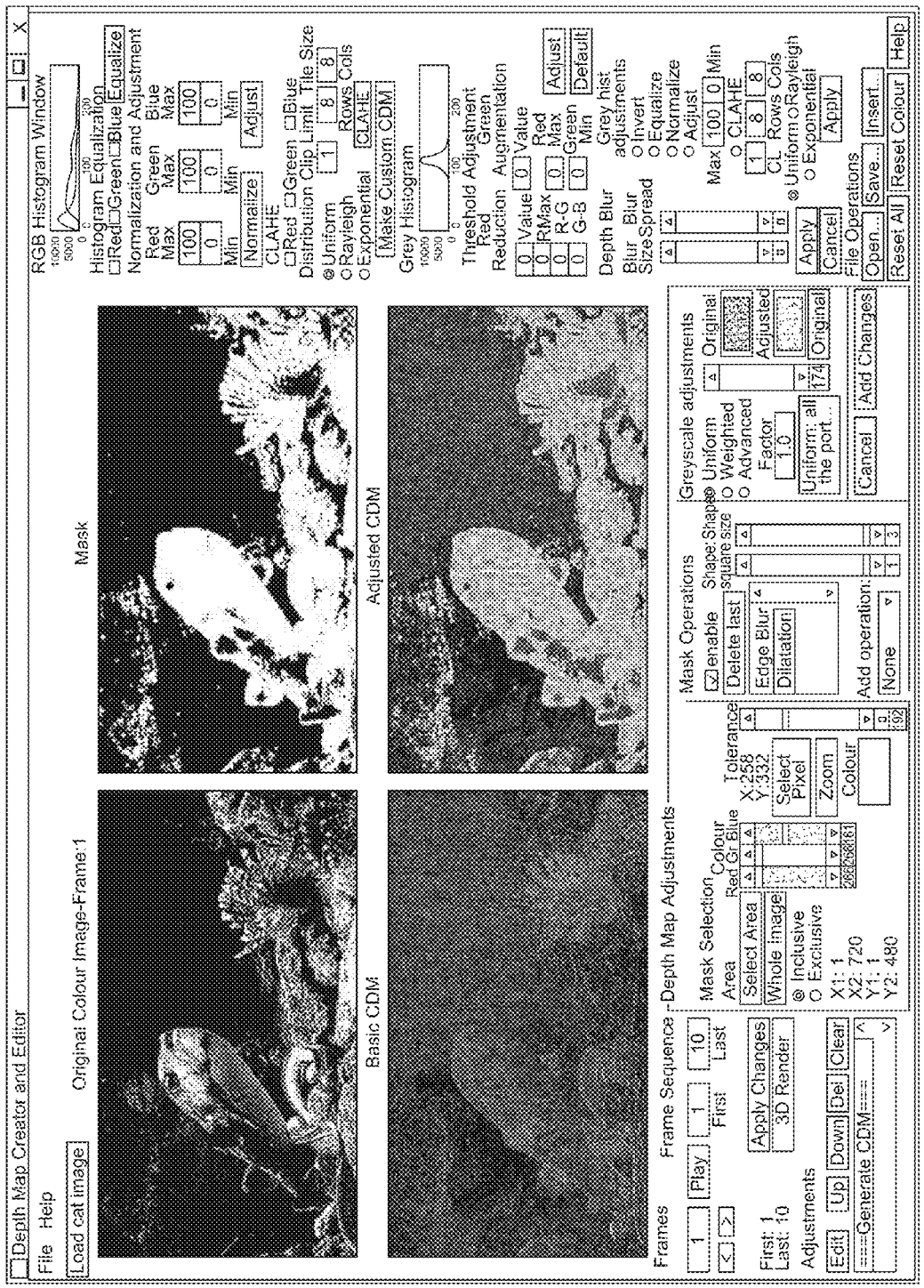
FIG. 14 is a view illustrating an appearance of the graphical user interface of FIG. 3 at the end of a depth map modification process for an exemplary color image.

By way of example, FIG. 14 illustrates an appearance of the GUI 300 of FIG. 3 at the end of the process of depth map editing for an exemplary color image. A grey-level image in the top left corner represents the first color image.

Various image processing operations and parameter settings, which may be used in the process of selecting the DAR and in selecting the depth modification rules, and then saved to be applied to other frames of a color video sequence in embodiments of the present invention, include but are not limited to the following operations and settings:

1) Independent RGB channel histogram equalization of the original colour image. Histogram equalization increases image contrast by effectively spreading out the distribution of the most frequent intensity values.

2) Independent RGB channel histogram normalization of the original colour image, wherein each of the R, G, and B channel may be independently normalized. Histogram equalization increases image contrast by effectively stretching out the distribution to cover the range between 0 and 255, or as specified by the user.

3) Independent RGB channel contrast-limited adaptive histogram equalization (CLAHE) of each of the R, G, and B channels of the original colour image. CLAHE increases image contrast by operating on small regions in the image rather than the entire image. The neighboring regions are then combined using bilinear interpolation to eliminate artificially induced boundaries.

4) Equalization, normalization, and CLAHE may also be performed for the histograms of the pixel intensities of the depth map itself.

5) Inversion of the pixel intensities of the depth map, such as from [0, 255] to [255, 0].

6) Symmetrical or asymmetrical Gaussian filtering of the pixel intensities of the depth map.

7) Colour correction of the original colour image to make changes to particular ranges of colors before editing, in embodiments wherein the original depth map is generated from a map of the intensity distribution of a single chrominance component in the original color image. By way of example, the intensity of pixels in the gray-level depth map that are associated with the pixels that depict high-intensity red and high-intensity green in the original colour image can be reduced and boosted, respectively. This reduction and augmentation for more comfortable stereoscopic viewing is recommended for surrogate depth maps that are generated from the V colour component of a YUV colour image, as is described in the US patent application No. 2008/0247670.

8) Conversion of the colour components of an original colour image to colour components of a different colour space, such as from RGB to Y'CbCr or CYMK, and then generating the original depth maps based on one of the new color components, or a combination of the new color components.

9) The first selected color (R1 G1 B1) and color tolerance value Δ selected for the identification of the like-colored pixels for which depth values are to be modified. These values are stored and can be used for processing other image frames to identify the like-colored pixels and the corresponding DAR for depth modification. The values can also be modified over frames in a gradual way to generate special depth effects over time.

10) The selected gray-level intensity value that is to replace the original pixel intensity values of the pixels in the DAR.

11) The selected parameters of either a 1D gradient or a 2D gradient of pixel intensities to replace the pixel intensities in the DAR.

12) Generation of various colour components of different colour spaces and their display as gray-level images, to facilitate comparison and selection of one of the images as a tentative depth map for further editing.

13) Rendering images with new camera viewpoints for 3D pre-view, such as anaglyph or glass-based or autostereoscopic multiview as known in the art.

According to one aspect of the invention, the method of the present invention may include the step of generating the original depth map 120, which can then be modified in selected regions as described hereinabove. In one embodiment, the original depth map may be generated using the color-based process, wherein a color image is decomposed to its constituent chrominance and luminance components, and a spatial intensity distribution of one of the chrominance components in the image is used, with optional adjustments, as generate the original depth map, as described in the U.S. Patent Application 2008/0247670 incorporated herein by reference. The method of the present invention may incorporate this process for generating the original depth map, and may further facilitate it by including the steps of i) displaying a plurality of grey scale images representing individual color components of the first color image 110 generated in a plurality of different color spaces for selection by the user; and, ii) generating the depth map 120 based on one or more of the grey scale images selected by the user.

Figure 12:
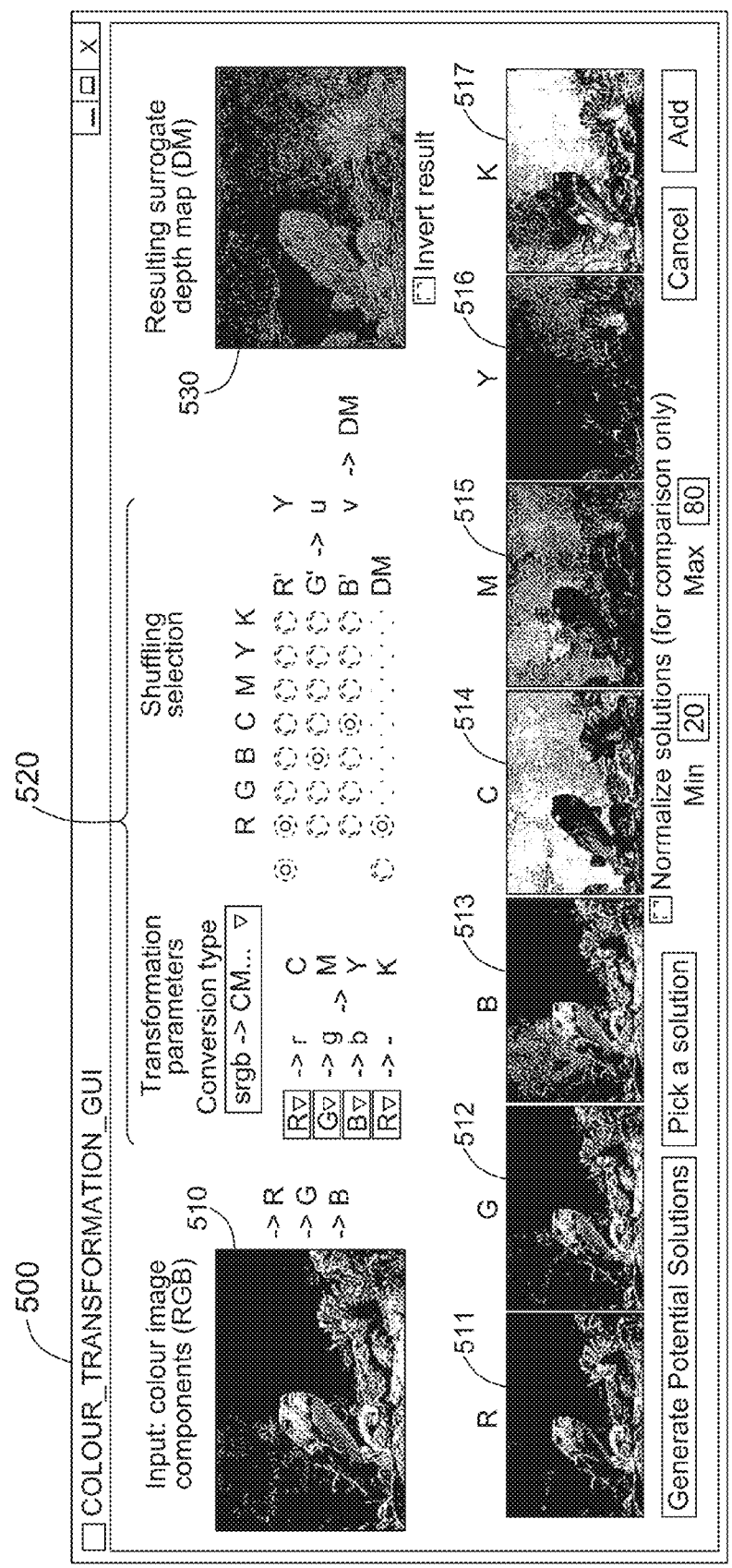
FIG. 12 is a diagrammatic view of a GUI panel for color space conversion, color component data manipulation, and for displaying of grey scale images of chrominance components of a monoscopic color image for selection as a surrogate depth map.

With reference to FIG. 12, the GUI 300 in one embodiment thereof provides a GUI panel or window 500 incorporating tools 520 for selecting a plurality of color spaces or models by the user, for simultaneously displaying grey-scale images of various chrominance components of the first color image 110, and for selecting by the user one of the displayed grey scale images as the depth map 120, or as a surrogate depth map which may then be further processed into the depth map 102 as described in the U.S. Patent Application 2008/0247670, and then modified in the selected DAR as described hereinbelow.

By way of example, FIG. 12 illustrates one embodiment of the GUI panel 500, which includes window 510 for displaying the first color image 110, which is represented in the figure as a black and white image for illustration, user input tools 520 for specifying a color space conversion, in the shown example—from the RGB format to the CMYK format, windows 511-513 for displaying grey-scale images of the original RGB components of the first color image 110, and windows 514-517 for displaying grey-scale images of the CMYK components of the converted first color image. One of the grey-scale images displayed in windows 511-517 may then be selected by the user for generating the depth map 120 therefrom, with the selected greyscale image displayed in window 530. User input tools 520 also allow a user to interchange color component data within and across colour spaces to generate the depth map 120.

Figure 13:
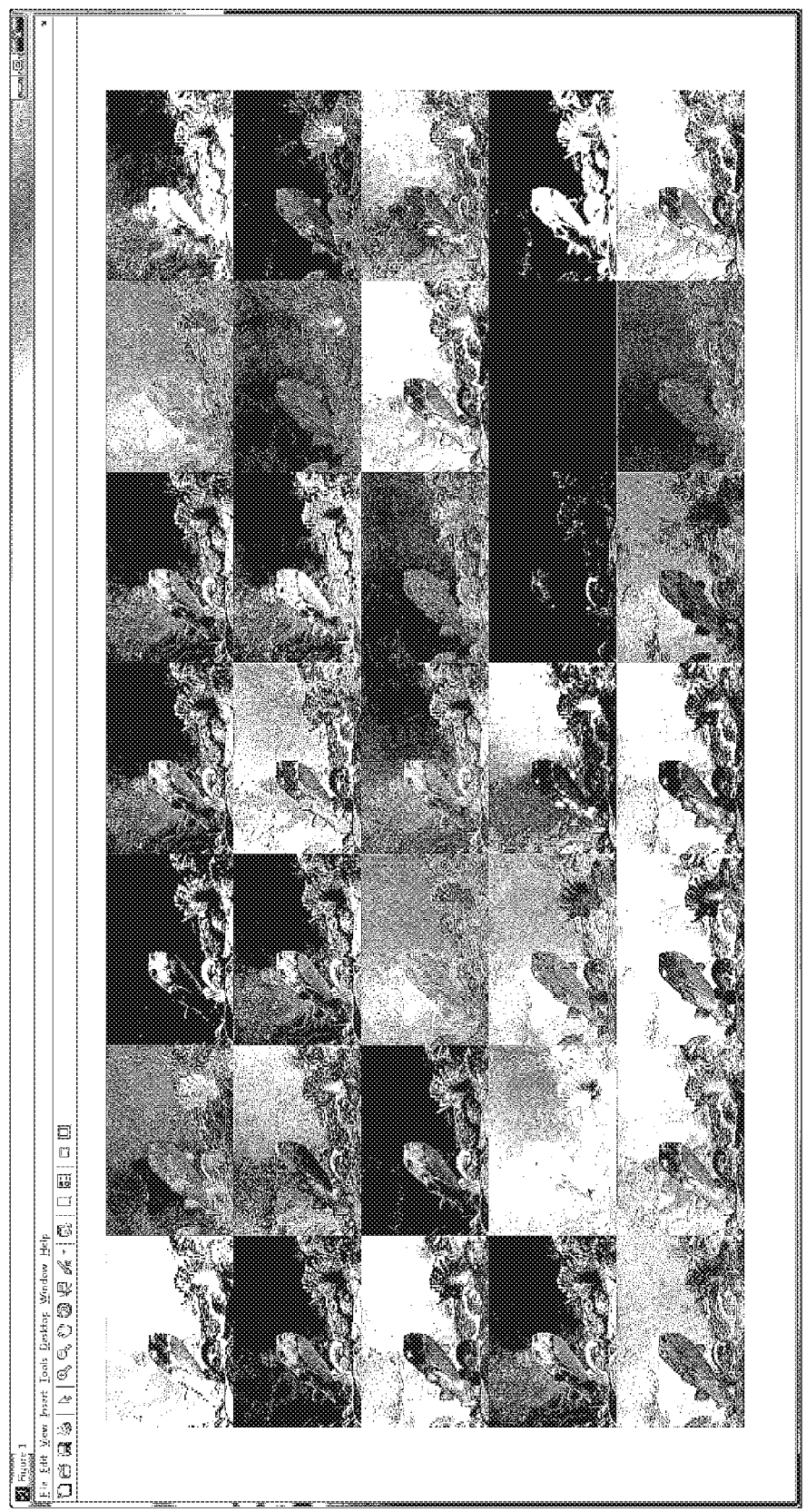
FIG. 13 is a diagrammatic view of a GUI panel for simultaneously displaying a grey scale images of various chrominance components of a monoscopic color image for a plurality of color spaces.

The GUI tools 520 enable to convert the first color image 110 from its original color space, for example RGB, to a plurality of different color spaces, and save the resulting grey-scale images of the respective color components in computer memory. The GUI 300 further provides means for simultaneously displaying all the generated grey scale images representing various color components of the first color image 110 in the selected color spaces on a screen of the computer display 181, as illustrated in FIG. 13, for selection by the user for generating the depth map therefrom.

The invention described hereinabove provides novel and efficient method and interactive graphical user interface for modifying the depth information in depth maps that are associated with 2D color images for stereoscopic applications. The method and the interactive graphical user interface enable the identification, selection of regions, and manipulation of the depth information in depth maps composed of gray-level images, by exploiting the correspondence of regions in a depth map with its color image counterpart. The selection of regions to be modified in the depth map is based on selection of regions in the color image, the color information of which makes it easier to select regions for manipulation. Furthermore, the aforedescribed method and interactive GUI lends itself very useful and convenient for generating, selecting and editing surrogate depth maps that are derived from one of the chrominance components of an original color image, for example, using the method disclosed in the U.S. Patent Application No. 2008/0247670, which is incorporated herein by reference.

The invention has been described hereinabove with reference to particular embodiments but is not limited thereto, and many other embodiments and variants of the method and apparatus described hereinabove may be envisioned by those skilled in the art. For example, although the concrete embodiments of the method described hereinabove utilize the RGB color components, other embodiments may utilize color components of other color spaces or models.

Of course numerous other embodiments may be envisioned without departing from the spirit and scope of the invention as defined by the appended claims.

We claim:

1. A computer-implemented method for modifying a depth map of a two-dimensional color image for enhancing a 3D image rendered therefrom, comprising:
   A) obtaining a first color image and a depth map associated therewith containing depth values for pixels of the first color image;
   B) displaying at least one of the first color image and the depth map on a computer display;
   C) selecting a depth adjustment region (DAR) in the depth map for modifying depth values therein by performing the steps of:
      a) receiving a first user input identifying a first pixel color within a range of colors of a target region in the first color image;
      b) upon receiving a second user input defining a pixel selection rule for selecting like-coloured pixels based on the first pixel color, using said pixel selection rule for identifying a plurality of the like-coloured pixels in the first color image;
      c) displaying a region visualization image (RVI) representing pixel locations of the plurality of like-coloured pixels;
      d) repeating steps (b) and (c) to display a plurality of different region visualization images corresponding to a plurality of different pixel selection rules for selection by a user; and
      e) identifying a region in the depth map corresponding to a user selected region visualization image from the plurality of different region visualization images, and adopting said region in the depth map as the DAR;
   D) generating a modified depth map by modifying the depth values in the DAR using a selected depth modification rule.

2. The method of claim 1, further comprising providing one or more GUI tools for displaying the first color image, the region visualization image, and the depth map on the computer screen, and for receiving the first and second user inputs.

3. The method of claim 2, wherein step (b) comprises:
   b1) obtaining n color component values for the first pixel color, said n color component values defining a pixel color in a selected color space, wherein $n \geq 2$; and,
   b2) applying user defined ranges of the n color component values about the values of respective color components obtained in step (b1) to identify the like-coloured pixels; and,
   wherein receiving the second user input comprises receiving parameter values defining the user defined ranges of the n color component values.

4. The method of claim 3, wherein the pixel selection rule comprises an instruction to perform a user selected image editing operation, and wherein step (b) further includes:
   applying, in response to the second user input, a user-selected image editing operation upon the first color image, wherein the image editing operation includes at least one of:
      a colour space conversion of the first color image;
      a modification of a colour component histogram;
      a modification of the histogram of the pixel intensities; and,
      a color correction operation on a color component of the first color image.

5. The method of claim 2, wherein the selected depth modification rule comprises at least one of:
   adjusting pixel values of the depth map within the DAR by a same value or in a same proportion;
   assigning a same new pixel value to each pixel within the DAR; and,
   applying a gradient to pixel values of the depth map within the DAR.

6. The method of claim 2, wherein step (D) comprises:
   D1) applying at least two different candidate depth modification rules to modify the depth map at depth map locations defined by the selected region visualization image to obtain at least two different candidate depth maps;

D2) displaying at least one of: the at least two different candidate depth maps on a computer display, or two different 3D images rendered therewith; and, D3) utilizing a user selected candidate depth map as the modified depth map for rendering the enhanced 3D image therewith, and adopting one of the at least two different candidate depth modification rules corresponding to the user selected candidate depth map as the selected depth modification rule.

7. The method of claim 6, further comprising a GUI tool for displaying a candidate depth map.

8. The method of claim 2, wherein step (b) further comprises excluding pixels of a second region in the first color image from the plurality of like-coloured pixels.

9. The method of claim 2, further comprising defining a third region in the first color image encompassing the target region, wherein pixel locations of the like-coloured pixels in step (b) are determined while excluding pixels outside of the third region.

10. The method of claim 2, wherein the first color image corresponds to one frame in a video sequence of frames representing a scene, and the method further comprises:

saving one of the plurality of the different color selection rules as selected by the user, and the selected depth modification rule obtained based on the first image in computer readable memory; and, applying the saved selected color selection and depth modification rules to modify depth values of like-coloured pixels of other frames in the video sequence.

11. The method of claim 1, wherein step (b) comprises displaying the depth map in the form of a grey-scale image having pixel intensity values representing the depth values of respective pixels of the first colour image.

12. The method of claim 1, wherein step (a) comprises receiving the first user input identifying a user selected pixel within the target region in the first color image, identifying a pixel color of the user selected pixel, and adopting said pixel color as the first color.

13. A method for modifying depth maps for 2D color images for enhancing 3D images rendered therewith, comprising:

a) selecting a first color image from a video sequence of color images and obtaining a depth map associated therewith, wherein said video sequence includes at least a second color image corresponding to a different frame from a same scene and having a different depth map associated therewith;

b) selecting a first pixel color in the first color image within a target region;

c) determining pixel locations of like-coloured pixels of the first color image using one or more color selection rules, the like-coloured pixels having a pixel color the same as the first pixel color or in a specified color tolerance range thereabout; and, d) applying a selected depth modification rule to modify the depth map of the first color image at depth map locations corresponding to the pixel locations of the like-coloured pixels to obtain a modified depth map of the first color image;

e) applying the one or more color selection rules and the selected depth modification rule to identify like-coloured pixels in the second color image of the video sequence and to modify the depth map of the second color image at depth map locations corresponding to the pixel locations of the like-coloured pixels in the second color image to obtain a modified depth map of the second color image; and, f) outputting the first and second color images and the modified depth maps associated therewith for rendering an enhanced video sequence of 3D images; and, wherein the one or more color selection rules and the selected depth modification rule are obtained based on the first color image.

14. The method of claim 13 wherein the first region in the depth map corresponds to a target object, which depth in the scene depicted in the video sequence is to be modified.

15. The method of claim 14, wherein the one or more color selection rules are adaptively defined based on the first color image using the steps of:

c1) determining n color component values for the first pixel color, said n color component values defining the pixel color in a selected color space, wherein $n \geq 2$;

c2) for each of the n color components, selecting a range of color component values about the value of said color component of the first pixel color;

c3) displaying a region visualization image indicating pixel locations of the like-coloured pixels for comparison with the target object in the first color image or in the depth map thereof;

c4) repeating steps (c1) and (c2) until at least a portion of the region visualization image is substantially congruent with the object.

16. The method of claim 1, further comprising:

displaying a plurality of grey scale images representing individual color components of the first color image rendered in a plurality of different color spaces for selection by the user;

generating the depth map based on one or more of the grey scale images selected by the user.

17. The method of claim 1, further comprising generating the depth map based on a grey scale image representing one or more color components of the first color image using the steps of:

displaying on a computer display a plurality of grey scale images representing individual color components of the first color image rendered in a plurality of different color spaces;

selecting one of the grey scale images for generating the depth map therefrom.

18. The method of claim 1, wherein the first color image corresponds to one frame in a video sequence of frames representing a scene, and wherein the method further comprises:

saving one of the plurality of the different pixel selection rules as selected by the user in computer readable memory; and, applying the saved pixel selection rule to identify like-coloured pixels in specified regions of color images corresponding to other frames from the sequence.

19. The method of claim 18, further comprising specifying a rule for defining the specified regions within each frame relative to a position of the identified like-coloured pixels within said frame.

* * * * *